US012367609B2

(12) United States Patent
Noda et al.

(10) Patent No.: US 12,367,609 B2
(45) Date of Patent: Jul. 22, 2025

(54) INFORMATION PROCESSING APPARATUS, INFORMATION PROCESSING METHOD, AND COMPUTER-READABLE RECORDING MEDIUM

(71) Applicant: SONY GROUP CORPORATION, Tokyo (JP)

(72) Inventors: Takuro Noda, Tokyo (JP); Ryouhei Yasuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 406 days.

(21) Appl. No.: 17/789,054

(22) PCT Filed: Dec. 24, 2020

(86) PCT No.: PCT/JP2020/048458
§ 371 (c)(1),
(2) Date: Jun. 24, 2022

(87) PCT Pub. No.: WO2021/140938
PCT Pub. Date: Jul. 15, 2021

(65) Prior Publication Data
US 2023/0047470 A1 Feb. 16, 2023

(30) Foreign Application Priority Data
Jan. 6, 2020 (JP) .................. 2020-000401

(51) Int. Cl.
*G06T 7/70* (2017.01)
*G06F 3/01* (2006.01)
(Continued)

(52) U.S. Cl.
CPC ............... *G06T 7/74* (2017.01); *G06F 3/013* (2013.01); *G06T 7/337* (2017.01); *G06V 40/193* (2022.01); *G06T 2207/30041* (2013.01)

(58) Field of Classification Search
CPC ....................... G06T 7/74; G06T 7/337; G06T 2207/30041; G06V 40/193; G06F 3/013
(Continued)

(56) References Cited

U.S. PATENT DOCUMENTS

2011/0228975 A1\* 9/2011 Hennessey .............. G06F 3/013
382/103
2014/0320397 A1 10/2014 Hennessey et al.
(Continued)

FOREIGN PATENT DOCUMENTS

CN 107003521 A 8/2017
CN 108475119 A 8/2018
(Continued)

OTHER PUBLICATIONS

International Search Report and Written Opinion of PCT Application No. PCT/JP2020/048458, issued on Mar. 30, 2021, 10 pages of ISRWO.

*Primary Examiner* — Michael R Neff
(74) *Attorney, Agent, or Firm* — CHIP LAW GROUP

(57) ABSTRACT

Provided is an information processing apparatus which includes a line-of-sight estimator, a correction amount calculator, and a registration determination section. The line-of-sight estimator calculates an estimation vector obtained by estimating a direction of a line of sight of a user. The correction amount calculator calculates a correction amount related to the estimation vector on the basis of at least one object that is within a specified angular range that is set using the estimation vector as a reference. The registration determination section determines whether to register, in a data store, calibration data in which the estimation vector and the correction amount are associated with each other, on the basis of a parameter related to the at least one object within the specified angular range.

20 Claims, 8 Drawing Sheets

(51) Int. Cl.
  *G06T 7/33* (2017.01)
  *G06T 7/73* (2017.01)
  *G06V 40/18* (2022.01)
(58) Field of Classification Search
  USPC .......................................................... 382/103
  See application file for complete search history.

(56) References Cited

U.S. PATENT DOCUMENTS

| | | |
|---|---|---|
| 2016/0085301 A1 | 3/2016 | Lopez |
| 2016/0139665 A1 | 5/2016 | Lopez et al. |
| 2017/0329400 A1* | 11/2017 | Noda ..................... G06F 3/013 |
| 2019/0018487 A1 | 1/2019 | Tsurumi |
| 2020/0154997 A1 | 5/2020 | Noda |

FOREIGN PATENT DOCUMENTS

| | | |
|---|---|---|
| EP | 3657299 A1 | 5/2020 |
| JP | 2017-134558 A | 8/2017 |
| JP | 2017-539108 A | 12/2017 |
| JP | 2018-505457 A | 2/2018 |
| JP | 2019-021049 A | 2/2019 |
| JP | 2019-215688 A | 12/2019 |
| KR | 10-2017-0058395 A | 5/2017 |
| KR | 10-2020-0035003 A | 4/2020 |
| WO | 2013/059940 A1 | 5/2013 |
| WO | 2016/075532 A1 | 5/2016 |
| WO | 2019/021601 A1 | 1/2019 |

\* cited by examiner

INFORMATION PROCESSING APPARATUS, INFORMATION PROCESSING METHOD, AND COMPUTER-READABLE RECORDING MEDIUM

CROSS REFERENCE TO RELATED APPLICATIONS

This application is a U.S. National Phase of International Patent Application No. PCT/JP2020/048458 filed on Dec. 24, 2020, which claims priority benefit of Japanese Patent Application No. JP 2020-000401 filed in the Japan Patent Office on Jan. 6, 2020. Each of the above-referenced applications is hereby incorporated herein by reference in its entirety.

TECHNICAL FIELD

The present technology relates to an information processing apparatus, an information processing method, and a computer-readable recording medium that can be applied to light-of-sight detection.

BACKGROUND ART

In the past, for example, a pupil method and a pupil corneal reflection method have been developed as methods for detecting a line of sight of a user. It is known that, in such methods for detecting a line of sight, there is a certain deviation of a direction detected by an apparatus from a direction in which a user is actually looking, due to, for example, an individual difference in a shape of an eyeball. In order to compensate for the deviation, there is a need to examine a difference between a location that the user is actually looking at and a direction of a line of sight detected when the user is looking at the location. Data that represents such a difference is used as data used to calibrate a line-of-sight direction.

For example, Patent Literature 1 discloses a method for performing calibration using an eye tracking system. In this system, a scene facing camera is provided that captures an image of a region in the field of view of a user, and a characteristic moving object in the field of view of the user is detected. An image of a pursuit motion performed when the moving object is visually tracked is captured by an eye tracking camera, and gaze data is generated. Then, a calibration parameter used to calibrate a line-of-sight direction is calculated on the basis of data of a motion of the moving object and the gaze data (for example, paragraphs [0006], [0007], [0012], and [0025], and FIGS. 3A and 3B in Patent Literature 1).

CITATION LIST

Patent Literature

Patent Literature 1: Japanese Unexamined Patent Application Publication No. 2018-505457

DISCLOSURE OF INVENTION

Technical Problem

In such a method for collecting data for calibration, the accuracy in detecting a line of sight may actually be reduced when the data accuracy is low. Thus, there is a need for a technology that makes it possible to prevent a reduction in the accuracy in detecting a line of sight.

In view of the circumstances described above, it is an object of the present technology to provide an information processing apparatus, an information processing method, and a computer-readable recording medium that make it possible to prevent a reduction in the accuracy in detecting a line of sight.

Solution to Problem

In order to achieve the object described above, an information processing apparatus according to an embodiment of the present technology includes a line-of-sight estimator, a correction amount calculator, and a registration determination section.

The line-of-sight estimator calculates an estimation vector obtained by estimating a direction of a line of sight of a user.

The correction amount calculator calculates a correction amount related to the estimation vector on the basis of at least one object that is within a specified angular range that is set using the estimation vector as a reference.

The registration determination section determines whether to register, in a data store, calibration data in which the estimation vector and the correction amount are associated with each other, on the basis of a parameter related to the at least one object within the specified angular range.

In the information processing apparatus, an estimation vector obtained by estimating a direction of a line of sight of a user, and a correction amount related to the estimation vector are calculated. The correction amount is calculated on the basis of at least one object that is within a specified angular range that is set using the estimation vector as a reference. Further, it is determined whether to register, in a data store, calibration data in which the estimation vector and the correction amount are associated with each other, on the basis of a parameter related to the at least one object. This makes it possible to accumulate proper calibration data, and thus to prevent a reduction in the accuracy in detecting a line of sight.

The registration determination section may determine whether the parameter related to the at least one object satisfies a specified condition, the registration determination section may register the calibration data in the data store when the parameter satisfies the specified condition, and the registration determination section does not necessarily have to register the calibration data in the data store when the parameter does not satisfy the specified condition.

The parameter related to the at least one object may include at least one of the number of the at least one object within the specified angular range, angular spacing of the at least one object relative to the estimation vector, a distance from a point of view to the at least one object, spacing of the at least one object, noticeability of the at least one object, or information regarding a selection operation of selecting the at least one object that is performed by the user.

The registration determination section may set reliability of the calibration data on the basis of the parameter related to the at least one object, and, on the basis of the reliability, the registration determination section may determine whether to register the calibration data in the data store.

The registration determination section may generate, as the calibration data, a data set in which the estimation vector, the correction amount, and the reliability are associated with each other.

The at least one object may include a plurality of objects. In this case, the parameter may include the number of the plurality of objects. Further, the registration determination section may set the reliability higher when there is a smaller number of the plurality of objects within the specified angular range.

The at least one object may include a plurality of objects. In this case, the parameter may include spacing of the plurality of objects. Further, the registration determination section may set the reliability higher when the spacing of the plurality of objects is smaller.

The parameter related to the at least one object may include angular spacing of the at least one object relative to the estimation vector. In this case, the registration determination section may set the reliability higher when the angular spacing is smaller.

The parameter related to the at least one object may include information regarding a selection operation of selecting the at least one object that is performed by the user. In this case, the registration determination section may set, to a maximum value, the reliability of the calibration data calculated on the basis of the at least one object selected by the selection operation being performed.

At least when the reliability is less than a first threshold, the registration determination section does not necessarily have to register the calibration data in the data store.

The data store may include a plurality of pieces of registered data that corresponds to the pieces of registered calibration data. In this case, the registration determination section may control the first threshold according to the number of the pieces of registered data.

The data store may include a plurality of pieces of registered data that corresponds to the pieces of registered calibration data. In this case, the registration determination section may extract the piece of registered data including a vector in which angular spacing of the vector and the estimation vector is less than or equal to a second threshold, and when the reliability is higher than reliability of the piece of registered data, the registration determination section may delete the piece of registered data from the data store, and may register the piece of calibration data having a higher reliability in the data store.

The at least one object may include a plurality of objects. In this case, the correction amount calculator may calculate the correction amount on the basis of an object that is situated closest to the estimation vector in the plurality of objects.

The at least one object may include a plurality of objects. In this case, the correction amount calculator may calculate the correction amounts corresponding to respective objects of the plurality of objects on the basis of the respective objects of the plurality of objects.

The registration determination section may cancel registration of the calibration data in the data store in response to a cancellation operation being performed by the user.

The estimation vector may be a vector obtained by estimating an optical axis of an eyeball of the user.

The correction amount calculator may set, to be the specified angular range, a range having a shape of a cone that has an apex angle of 20 degrees or less, with the estimation vector being a central axis of the cone.

The correction amount calculator may set a boundary plane in a depth direction of the specified angular range on the basis of an angle of convergence that is formed by the lines of sight of the user.

An information processing method according to an embodiment of the present technology is an information processing method that is performed by a computer system, and includes calculating an estimation vector obtained by estimating a direction of a line of sight of a user.

A correction amount related to the estimation vector is calculated on the basis of at least one object that is within a specified angular range that is set using the estimation vector as a reference.

It is determined whether to register, in a data store, calibration data in which the estimation vector and the correction amount are associated with each other, on the basis of a parameter related to the at least one object within the specified angular range.

A computer-readable recording medium according to an embodiment of the present technology records therein a program that causes a computer system to perform a process including:
calculating an estimation vector obtained by estimating a direction of a line of sight of a user;
calculating a correction amount related to the estimation vector on the basis of at least one object that is within a specified angular range that is set using the estimation vector as a reference; and
determining whether to register, in a data store, calibration data in which the estimation vector and the correction amount are associated with each other, on the basis of a parameter related to the at least one object within the specified angular range.

MODE(S) FOR CARRYING OUT THE INVENTION

Figure 1:
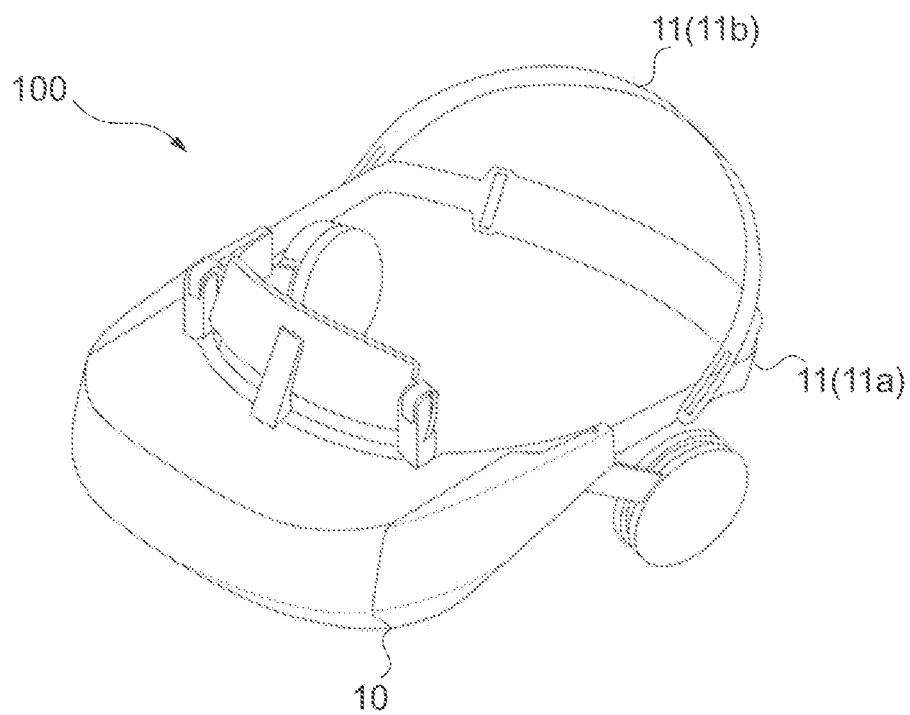
FIG. 1 schematically illustrates an appearance of a head-mounted display according to an embodiment of the present technology.
Figure 2:
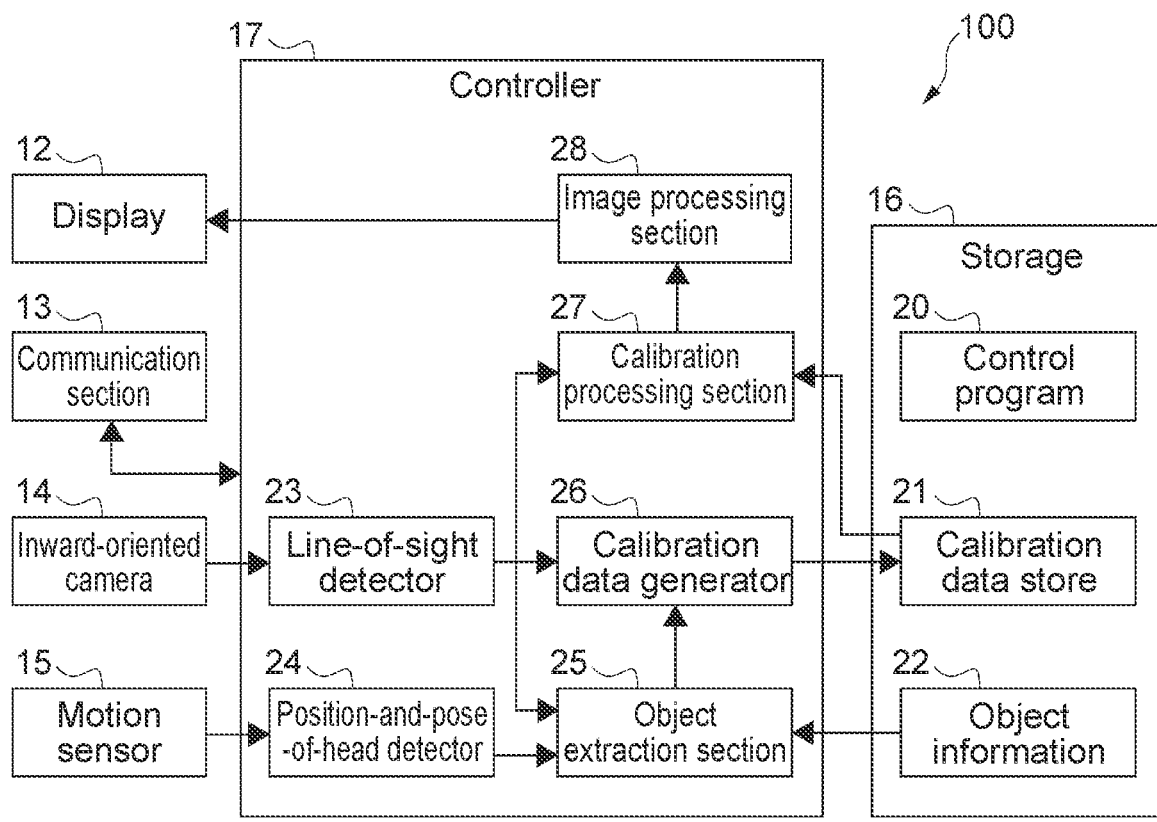
FIG. 2 is a block diagram illustrating an example of a configuration of the HMD illustrated in FIG. 1.

Embodiments according to the present technology will now be described below with reference to the drawings.
[Configuration of Information Processing Apparatus]
FIG. 1 schematically illustrates an appearance of a head-mounted display (HMD) according to an embodiment of the present technology. FIG. 2 is a block diagram illustrating an example of a configuration of an HMD 100 illustrated in FIG. 1. The HMD 100 is used by being worn on the head of a user, and serves as a display apparatus that displays an image in the field of view of the user. The user wearing the HMD 100 can experience, for example, virtual reality (VR) or augmented reality (AR).

Further, the HMD 100 is configured to detect a line of sight of a user. Specifically, a line-of-sight vector that represents a direction of the line of sight of the user is detected. The use of the line-of-sight vector makes it possible to perform, for example, an input operation using the line of sight of the user.

As illustrated in FIG. 1, the HMD 100 includes a base 10 and an attachment band 11.

The base 10 is a member arranged in front of left and right eyes of a user. The base 10 is configured to cover the field of view of the user, and serves as a housing that accommodates therein, for example, a display 12 used to display an image.

The attachment band 11 is attached to the head of the user. As illustrated in FIG. 1, the attachment band 11 includes a side-of-head band 11a and a top-of-head band 11b. The side-of-head band 11a is connected to the base 10, and is attached to surround the head of the user from the side to the back of the head. The top-of-head band 11b is connected to the side-of-head band 11a, and is attached to surround the head of the user from the side to the top of the head. This makes it possible to hold the base 10 in front of the eyes of the user.

As illustrated in FIG. 2, the HMD 100 further includes the display 12, a communication section 13, an inward-oriented camera 14, a motion sensor 15, a storage 16, and a controller 17.

The display 12 is provided to the base 10 to cover at least a portion of the field of view of a user. For example, two displays 12 are arranged in the field of view of the user to respectively display thereon an image for the left eye and an image for the right eye. Alternatively, a configuration in which the image for the left eye and the image for the right eye are displayed using a single display 12, may be adopted. Further, for example, a lens used to adjust focus may be provided between the display 12 and the left and right eyes of the user.

For example, an organic EL display or a liquid crystal display (LCD) is used as the display 12. Moreover, a specific configuration of the display 12 is not limited.

The communication section 13 is a module used to perform, for example, network communication or near-field communication with another device. For example, a wireless LAN module such as Wi-Fi, or a communication module such as Bluetooth (registered trademark) is provided as the communication section 13.

Further, the communication section 13 communicates with an input apparatus (of which an illustration is omitted) used by a user to perform, for example, an operation input with the hand of the user, and receives the operation input performed by the user. For example, an apparatus (such as a game controller) that includes, for example, a selection button, an analog stick, and a switch is used as the input apparatus. The type and the like of the input apparatus are not limited, and, for example, a mouse and a keyboard may be used.

The inward-oriented camera 14 captures an image of an eyeball of a user. An eyeball image of the eyeball of the user is used to detect a line of sight, which will be described later. The inward-oriented camera 14 is configured using, for example, a left-eye camera and a right-eye camera that are arranged inside the base 10 to be respectively capable of capturing images of the left eye and the right eye of the user.

For example, a digital camera that includes an image sensor such as a complementary metal-oxide semiconductor (CMOS) sensor or a charge coupled device (CCD) sensor is used as the inward-oriented camera 14 (the left-eye camera and the right-eye camera). Further, for example, an infrared camera that includes an infrared light source such as an infrared LED may be used. This makes it possible to capture an infrared image of an eyeball and to detect a line of sight with a high degree of accuracy. A specific configuration of the inward-oriented camera 14 is not limited.

The motion sensor 15 is a sensor that detects information regarding a movement of the HMD 100. For example, the motion sensor 15 is arranged by being fixed at a specified position in the base 10, and detects, for example, an inclination and a rotation of the HMD 100. Thus, it can also be said that the motion sensor 15 is a sensor that detects information regarding a movement of the head of a user wearing the HMD 100.

For example, an inertial measurement unit (IMU) is used as the motion sensor 15. The inertial measurement unit is a sensor that detects an angular velocity and acceleration in three dimensions using, for example, a three-axis gyroscope and a three-axis accelerometer. Further, for example, a nine-axis sensor that includes a three-axis speedometer in addition to a three-axis gyroscope and a three-axis accelerometer may be used as the motion sensor 15. The type of the motion sensor 15 is not limited, and any sensor that can detect a movement of the HMD 100 may be used.

Moreover, the sensor included in the HMD 100 is not limited. For example, an external sensor that detects information regarding the outside of the HMD 100 may be provided. For example, a digital camera (an outward-oriented camera) that captures an image of a region situated in front of the HMD 100 (in front of the user) is used as the external sensor. Further, for example, a camera, such as a stereo camera or a time-of-flight (ToF) sensor, that can detect, for example, information regarding a depth of a real space may be used as the external sensor. For example, an AR experience or the like can be provided by an image detected by the external sensor being displayed on the display 12. Moreover, a radar sensor, a LiDAR sensor, or the like may be included as the external sensor.

The storage 16 is a nonvolatile storage device. For example, a recording medium using a solid-state device such as a solid-state drive (SSD), or a magnetic recording medium such as a hard disk drive (HDD) is used as the storage 16. Moreover, the type and the like of a recording medium used as the storage 16 are not limited, and, for example, any recording medium that non-transiently records therein data may be used.

The storage 16 stores there in a control program 20, a calibration data store 21, and object information 22. In the present embodiment, the storage 16 corresponds to a computer-readable recording medium that records therein a program.

The control program 20 is a program used to control an operation of the overall HMD 100. In the present embodiment, the control program 20 corresponds to a program recorded in a recording medium.

The calibration data store 21 is a database that stores therein a plurality of pieces of calibration data used to perform calibration processing of calibrating a line-of-sight vector of a user. In other words, it can be said that the calibration data store is a group of pieces of calibration data including a plurality of pieces of calibration data. In the present embodiment, the calibration data store 21 corresponds to a data store.

The object information 22 is, for example, information regarding a virtual object displayed on the display 12. For example, display parameters such as a shape, a size, and a color of the virtual object are stored as object information.

Moreover, information stored in the storage 16 is not limited.

Here, a basic method for generating calibration data is described.

Figure 3A:
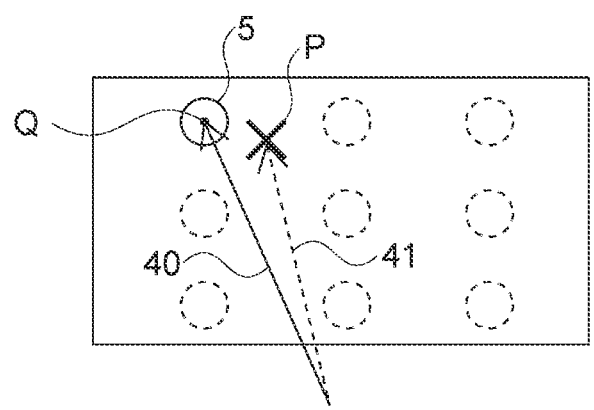
FIGS. 3A and 3B are schematic diagrams used to describe processing of generating calibration data.
Figure 3B:
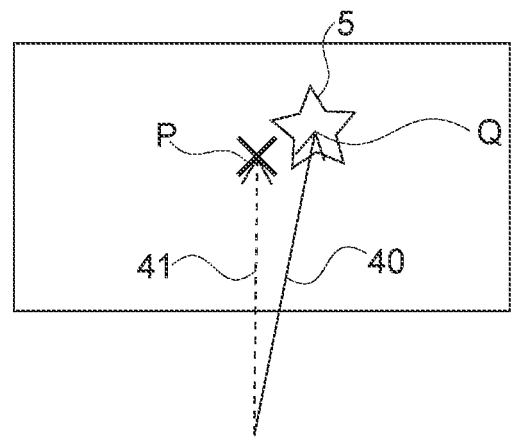

FIGS. 3A and 3B are schematic diagrams used to describe processing of generating calibration data. Processing performed to generate calibration data is hereinafter simply referred to as data generation processing.

In the HMD 100, first data-generation processing of generating calibration data by displaying a dedicated UI screen, and second data-generation processing of generating calibration data during execution of an application (a content program) are performed.

FIG. 3A schematically illustrates an example of a dedicated UI screen used to perform the first data-generation processing. On this UI screen, a virtual object 5 is displayed at a specified position in a display region of the display 12. In-A of FIG. 3A, nine display positions are set, and the virtual objects 5 are displayed at the respective display positions in turns.

Here, the user is instructed to gaze at a displayed virtual object 5, and a line-of-sight vector 40 of the user is detected every time the virtual object 5 is displayed at a different display position. FIG. 3A schematically illustrates a gaze point P that represents the line-of-sight vector 40, using a mark of X.

When the line-of-sight vector 40 is detected, a position vector 41 of the virtual object 5 that connects a point of view of the user (an origin of the line-of-sight vector) to a position of the displayed virtual object 5 (for example, a center point Q) is calculated. Then, a correction amount of rotation of (a correction amount for) the line-of-sight vector 40 with respect to the position vector 41 is calculated.

Here, for example, the correction amount of rotation is an amount of rotation of a three-dimensional vector, the rotation amount being necessary for the position vector 41 and the line-of-sight vector 40 to coincide with each other. For example, the correction amount of rotation is calculated as Euler angles represented by roll, pitch, and yaw, or quaternions used to represent an amount of rotation.

A data set including the line-of-sight vector 40 and a correction amount for the line-of-sight vector 40 is generated as calibration data, and is recorded in the calibration data store. In the example illustrated in FIG. 3A, nine data sets are stored in the calibration data store.

It can be said that the first data-generation processing performed using a dedicated UI screen, as described above, is a static calibration performed by pausing, for example, an application.

FIG. 3B schematically illustrates an example of a screen on which the second data-generation processing is performed. FIG. 3B schematically illustrates the virtual object 5 displayed during execution of an application. In the second data-generation processing, calibration data is generated using the virtual object 5 assumed to be attracting attention from a user.

For example, it is assumed that the gaze point P of the line-of-sight vector 40 of a user is detected near the virtual object 5, as illustrated in FIG. 3B. In this case, under the assumption that it is highly probable that the user is gazing at the virtual object 5 near the gaze point P, a correction amount is calculated using the virtual object 5 as a reference.

In other words, a correction amount for (a correction amount of rotation of) the line-of-sight vector 40 with respect to the position vector 41 of the nearby virtual object 5 (center point Q) is calculated. Then, a data set including the line-of-sight vector 40 and the correction amount is recorded as calibration data in the calibration data store.

As described above, it can be said that the second data-generation processing is a dynamic calibration performed during execution of, for example, an application. In this case, a plurality of data sets each including a correction amount and an estimation vector is formed for a plurality of directions since, for example, a position at which the virtual object 5 is displayed is not yet determined.

Note that the method for configuring the calibration data store 21 is not limited. For example, calibration data generated by the first data-generation processing and calibration data generated by the second data-generation processing may be registered in the same database, or may be registered as different databases.

Figure 4:
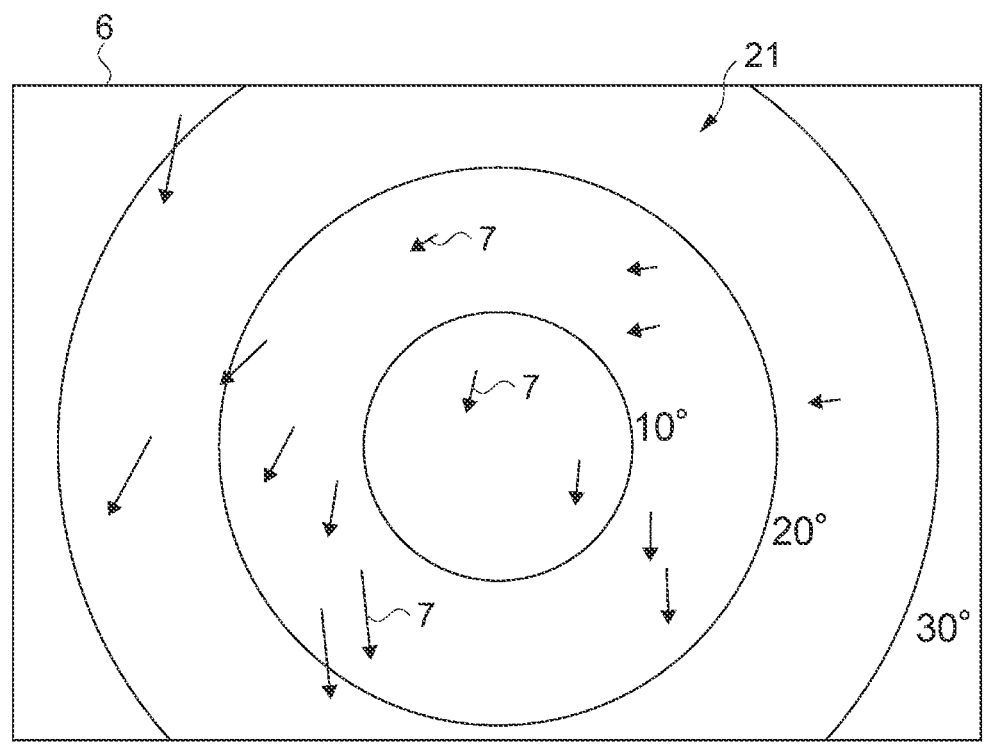
FIG. 4 schematically illustrates an example of calibration data recorded in a calibration data store.

FIG. 4 schematically illustrates an example of calibration data recorded in the calibration data store 21. In FIG. 4, a plurality of pieces of calibration data 7 is plotted in a field of view 6 of a user (in a region surrounded by a rectangular outer frame) using arrows.

An origin of each arrow corresponds to the line-of-sight vector 40 (or the gaze point P of the line-of-sight vector 40). Further, a length of the arrow represents a magnitude of a correction amount of rotation. Furthermore, a direction of the arrow represents an orientation of the correction amount of rotation (a rotation direction).

Note that circular regions illustrated in FIG. 4 respectively represent ranges when the line of sight is tilted at angles of 10 degrees, 20 degrees, and 30 degrees, with the center (0 degrees) of the circle being defined as a state in which the user is looking at the front.

The calibration data 7 illustrated in FIG. 4 is, for example, data accumulated using the second data-generation processing. Thus, the calibration data store 21 is a database that records therein a plurality of pieces of calibration data 7 respectively corresponding to various directions in the field of view. This makes it possible to use, for example, calibration data with which a space between data points recorded by the first data-generation processing can be filled, and thus to improve the accuracy in detecting a line of sight.

As described above, the calibration data store 21 includes a plurality of pieces of registered data corresponding to the pieces of registered calibration data 7. The plurality of pieces of registered data is used when actual calibration processing is performed.

Note that the calibration data 7 generated by the second data-generation processing may include data with a low degree of accuracy. For example, in the example illustrated in FIG. 3B, there is a possibility that it will not be certain that the user is actually looking at the virtual object 5. If such calibration data 7 is registered, this may result in a reduction in the accuracy in detecting a line of sight.

In the present embodiment, data generation processing is controlled in order not to register the calibration data 7 with a low degree of accuracy.

Returning to FIG. 2, the controller 17 controls operations of the respective blocks of the HMD 100. The controller 17 is configured by hardware, such as a CPU and a memory (a RAM and a ROM), that is necessary for a computer. Various processes are performed by the CPU loading, into the RAM, the control program 20 stored in the storage 16 and executing the control program 20. In the present embodiment, the controller 17 corresponds to an information processing apparatus.

For example, a programmable logic device (PLD) such as a field programmable gate array (FPGA), or another device such as an application specific integrated circuit (ASIC) may be used as the controller 17. Further, for example, a processor such as a graphics processing unit (GPU) may be used as the controller 17.

Note that the controller 17 and the storage 16 may be separate from a body of the HMD 100. For example, the HMD 100 may be controlled by the body of the HMD 100 and, for example, the controller 17 communicating with each other through, for example, a communication section (not illustrated). This results in reducing power consumption in the body of the HMD 100, and in being able to improve uptime of the HMD 100.

In the present embodiment, a line-of-sight detector 23, a position-and-pose-of-head detector 24, an object extraction section 25, a calibration data generator 26, a calibration processing section 27, and an image processing section 28 are implemented as functional blocks by the CPU of the controller 17 executing a program according to the present embodiment. Then, an information processing method according to the present embodiment is performed by these functional blocks. Note that, in order to implement each functional block, dedicated hardware such as an integrated circuit (IC) may be used as appropriate.

The line-of-sight detector 23 calculates an estimation line-of-sight vector obtained by estimating a direction of a line of sight of a user. The estimation line-of-sight vector is a vector that represents a result of estimating the direction of the line of sight of the user, and is a line-of-sight vector before calibration processing is performed by the calibration processing section 27, which will be described later. For example, a correction amount for an estimation line-of-sight vector is calculated by the data generation processing of generating calibration data, which has been described with reference to FIGS. 3A and 3B. In the present embodiment, the estimation line-of-sight vector corresponds to an estimation vector.

In the line-of-sight detector 23, an estimation line-of-sight vector is calculated by a line-of-sight detection method using, for example, a three-dimensional model of a human eyeball (an eyeball model).

Figure 5:
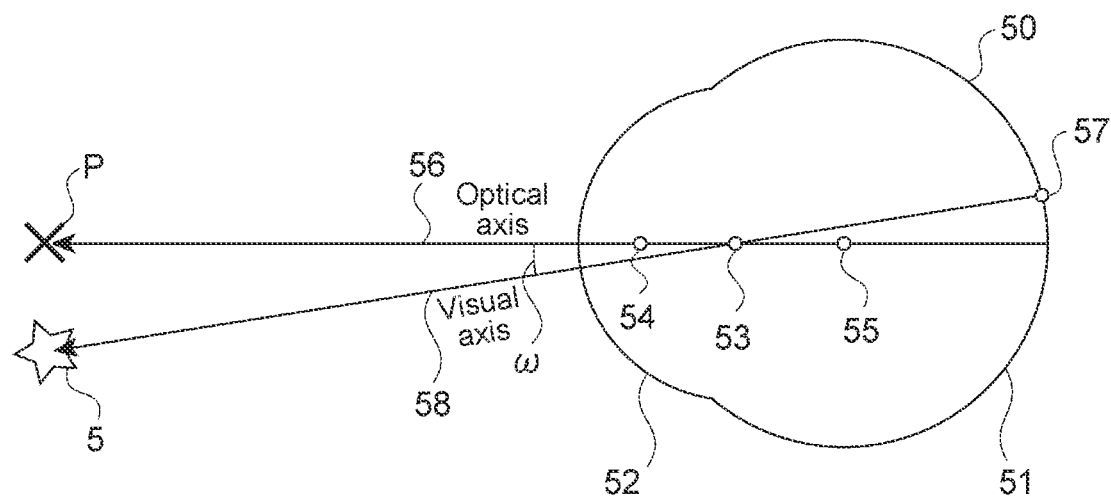
FIG. 5 schematically illustrates an example of an eyeball model.

FIG. 5 schematically illustrates an example of an eyeball model. An eyeball model 50 is a model that represents a human eyeball using an eyeball body 51 and a cornea 52 that is connected to the eyeball body 51.

In the eyeball model 50, the eyeball body 51 is a sphere. Further, the cornea 52 is a portion of a sphere that has a smaller radius than the eyeball body 51. The center of the sphere used to represent the cornea 52 is hereinafter referred to as a corneal curvature center 53. The corneal curvature center 53 is a point that represents, for example, a nodal point of a central posterior surface of a lens. Further, a pupil center 54 that is a center of a pupil exists inside the sphere used to represent the cornea 52.

In the eyeball model 50, a direction determined by connecting the corneal curvature center 53 to the pupil center 54 is a direction of an optical axis 56 of the eyeball that passes through the center of the eyeball body 51 (an eyeball center 55), as illustrated in FIG. 5. In other words, the optical axis 56 is a normal line of the cornea 52 that passes through the pupil center 54.

The direction of the optical axis 56 of an eyeball can be estimated using the eyeball model 50.

In the present embodiment, the optical axis 56 is estimated by the line-of-sight detector 23 on the basis of the eyeball model 50. Thus, an estimation line-of-sight vector calculated by the line-of-sight detector 23 is a vector (an optical-axis vector) obtained by estimating the optical axis 56 of an eyeball of a user.

For example, a pupil corneal reflection method or a pupil method using an eyeball image captured by the inward-oriented camera 14 is used as a method for estimating an optical-axis vector.

In the pupil corneal reflection method, an image of an eyeball is captured using, for example, an infrared camera (the inward-oriented camera 14) and an infrared light source. In this case, a bright spot (a Purkinje image) generated by infrared light being reflected off, for example, a cornea appears in the eyeball image. An optical-axis vector (an estimation line-of-sight vector) is calculated on the basis of the bright spot generated by infrared light and a position of a pupil. This makes it possible to estimate the optical axis 56 of an eyeball with a high degree of accuracy.

Further, in the pupil method, an optical-axis vector (an estimation line-of-sight vector) is calculated by detecting a position of a pupil with respect to a feature point, such as a corner of an eye, that is included in an eyeball image. This method makes it possible to reduce the number of components since there is no need to provide, for example, an infrared light source.

Moreover, the line-of-sight detection method is not limited, and, for example, a method for calculating an optical-axis vector using, for example, machine learning may be used.

The line-of-sight detector 23 calculates an estimation line-of-sight vector for each of the left and right eyeballs of a user. Then, the calculated estimation line-of-sight vectors are combined as appropriate to calculate a single estimation line-of-sight vector. Without being limited thereto, for example, the estimation line-of-sight vector may be calculated for each of the left and right eyeballs. The present technology can also be applied in such a case.

Note that the line of sight of the user is situated on a visual axis 58 that connects the corneal curvature center 53 to a fovea 57 situated in the eyeball body 51, as illustrated in FIG. 5. In other words, a direction in which the user is actually looking is not a direction along the optical axis 56, but a direction along the visual axis 58.

Thus, a vector (the visual axis 58) oriented toward a target (for example, the virtual object 5) that the user is gazing at does not necessarily coincide with an optical-axis vector. Therefore, for example, the estimation line-of-sight vector calculated by the line-of-sight detector 23 is a vector that deviates from an actual line-of-sight direction by a constant amount of deviation.

An amount of deviation of the visual axis 58 from the optical axis 56 is, for example, about five degrees. Note that there is a difference between individuals in a deviation of the visual axis 58 from the optical axis 56, and the visual axis 58 is generally inclined at an angle of about four to eight degrees. An amount of deviation of the visual axis 58 from the optical axis 56 is hereinafter referred to as ω.

In the present embodiment, such an amount of deviation Ω is corrected by calibration processing (calibration) using calibration data, and a direction in which the user is actually looking (an actual line-of-sight direction) is detected.

Returning to FIG. 2, the position-and-pose-of-head detector 24 reads a result of detection performed by the motion sensor 15, and detects a position and a pose of a head of a user.

For example, a direction of movement of the head is estimated on the basis of the result of detection performed by the motion sensor 15 to detect the position of the head. The position of the head is, for example, a base point (a point of view) of a direction of a line of sight of the user. Further, for example, a pose of the head is detected on the basis of, for example, a tilt of the head.

Further, a direction and an angle of rotation of the head of the user are detected by the position-and-pose-of-head detector 24. For example, an amount of a change in the pose of the head is calculated on the basis of a pose of the head at a certain timing. For example, the direction and the angle of rotation of the head are detected on the basis of the change amount.

The method for detecting, for example, a position and a pose of a head, and a direction and an angle of rotation of the head are not limited.

The object extraction section 25 extracts the virtual object 5 used to generate the calibration data 7, on the basis of an estimation line-of-sight vector calculated by the line-of-sight detector 23. Specifically, object information is retrieved on the basis of the estimation line-of-sight vector, and a position and a pose of the head. Then, information regarding a corresponding object is read as appropriate.

Figure 6:
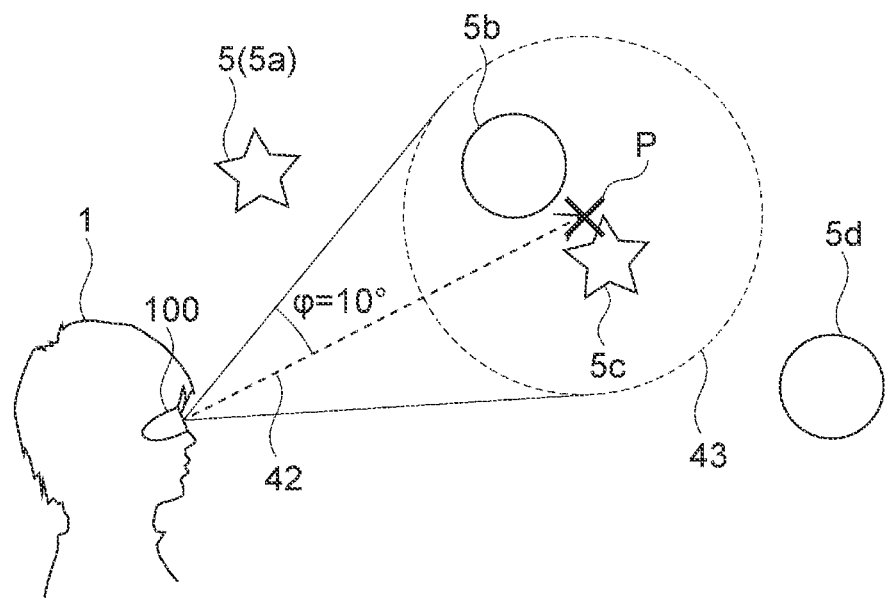
FIG. 6 schematically illustrates an example of a virtual object displayed in the field of view of a user through the HMD.

FIG. 6 schematically illustrates an example of the virtual object 5 displayed in the field of view of the user 1 through the HMD 100. As illustrated in FIG. 6, various virtual objects 5 can be displayed in the field of view of the user 1 wearing the HMD 100.

Further, the virtual object 5 can be displayed by being localized in a virtual space. In this case, when a point of view of the user 1 is moved due to the user 1 performing motion such as moving, or turning his/her head around, there is a change in how the virtual object 5 looks to the user 1. The virtual object 5 is an example of an object according to the present embodiment.

In the present embodiment, at least one virtual object 5 within a target angular range 43 that is set using the estimation line-of-sight vector 42 as a reference, is extracted by the object extraction section 25.

FIG. 6 schematically illustrates the estimation line-of-sight vector 42 calculated by the line-of-sight detector 23, and the target angular range 43.

For example, the target angular range 43 is a range having a shape of a cone, where the origin of the estimation line-of-sight vector 42 is an apex of the cone, and the estimation line-of-sight vector 42 is a central axis of the cone. For example, such a conical angular range is represented as a circular range in a plane orthogonal to the estimation line-of-sight vector 42. In the present embodiment, the target angular range 43 corresponds to a specified angular range.

As described with reference to FIG. 5, the amount of deviation of the visual axis 58 from the optical axis 56 corresponds to an angle of about four to eight degrees in the case of a human eyeball. In the present embodiment, an angle φ that corresponds to a radius of a circular range corresponding to the target angular range 43 is set to ten degrees. In other words, an angular range formed by lines that respectively deviate from the estimation line-of-sight vector 42 by the angle φ of ten degrees, corresponds to the target angular range 43.

In this case, an apex angle of the cone representing the target angular range 43 is 20 degrees. As described above, in the present embodiment, the object extraction section 25 sets, to be the target angular range 43, a range having a shape of a cone that has an apex angle of 20 degrees, with the estimation line-of-sight vector 42 being a central axis of the cone.

This makes it possible to extract the virtual object 5 in a range that includes the visual axis 58 of a user.

In the example illustrated in FIG. 6, from among four virtual objects 5a to 5d that are displayed in the field of view of the user 1, the virtual objects 5b and 5c are within the target angular range 43.

The object extraction section 25 specifies the virtual objects 5b and 5c, and reads object information regarding the virtual objects 5b and 5c from the storage 16.

The read object information is output to the calibration data generator 26.

On the basis of the virtual object 5 within the target angular range 43, the calibration data generator 26 generates the calibration data 7 for a current estimation line-of-sight vector 42.

Specifically, a correction amount of rotation of the estimation line-of-sight vector 42 with respect to a position vector of the virtual object 5 within the target angular range 43 is calculated as a correction amount for the estimation line-of-sight vector 42. As described above, the calibration data generator 26 calculates a correction amount for the estimation line-of-sight vector 42 on the basis of at least one virtual object 5 within the target angular range 43 being set using the estimation line-of-sight vector 42 as a reference.

A data set that includes the correction amount and the estimation line-of-sight vector 42 is the calibration data 7.

Further, on the basis of an object parameter regarding at least one virtual object 5 within the target angular range 43, the calibration data generator 26 determines whether to register, in the calibration data store 21, the calibration data 7 in which the estimation line-of-sight vector 42 and the correction amount are associated with each other.

Here, the object parameter is a parameter that can represent, for example, a state of the virtual object 5 in the target angular range 43. Examples of the object parameter include a parameter that represents a feature for each virtual object 5, and a parameter that represents, for example, a state of the virtual object 5 in the target angular range 43.

As described above, in the HMD 100, not all of the pieces of generated calibration data 7 are registered in the calibration data store 21, but the piece of calibration data 7 used to perform calibration processing is selected on the basis of the object parameter. This makes it possible to maintain the quality of the calibration data store 21, and to prevent, for example, a reduction in the accuracy in detecting a line of sight.

The object parameter is calculated on the basis of, for example, object information read by the object extraction section 25. The object parameter will be described in detail later. In the present embodiment, the object parameter corresponds to a parameter regarding at least one object within a specified angular range.

In the present embodiment, the calibration data generator 26 sets the reliability of the calibration data 7 on the basis of an object parameter. Then, on the basis of the set reliability, the calibration data generator 26 determines whether to register the calibration data 7 in the calibration data store 21.

Thus, it can be said that the reliability is used as a reference when the calibration data 7 is registered. This makes it possible to, for example, only accumulate sufficiently reliable calibration data 7 in the calibration data store 21.

In response to the determination described above, the calibration data generator 26 outputs, to the storage 16, the calibration data 7 determined to be registered, and registers the calibration data 7 in the calibration data store 21. This makes it possible to perform the second data-generation processing (dynamic calibration) of accumulating new calibration data 7 in the calibration data store 21 even during execution of, for example, an application.

In the present embodiment, when the calibration data 7 is registered in the calibration data store 21, the reliability of the calibration data 7 is registered together with the calibration data 7. In other words, the calibration data generator 26 generates, as calibration data, a data set in which an estimation line-of-sight vector, a correction amount, and the reliability are associated with each other.

In the present embodiment, a correction amount calculator is implemented by the object extraction section 25 and the calibration data generator 26 working cooperatively. Further, the calibration data generator 26 also serves as a registration determination section.

The calibration processing section 27 performs calibration processing on the estimation line-of-sight vector 42 calculated by the line-of-sight detector 23. Specifically, the estimation line-of-sight vector 42 is corrected for on the basis of the calibration data 7 registered in the calibration data store 21. It can be said that this processing is processing of deflecting the estimation line-of-sight vector 42 representing the optical axis 56 of an eyeball in a direction along the visual axis 58.

The calibration processing is performed by the calibration processing section 27 independently of the above-described processing of generating the calibration data 7. In other words, the processing of generating the calibration data 7 is performed in a background of the calibration processing.

For example, at least one piece of data including a vector close to a calibration-target estimation line-of-sight vector 42 is retrieved from the pieces of registered calibration data 7 (pieces of registered data).

Correction amounts (correction amounts of rotation) respectively included in the pieces of data are weight-averaged in consideration of the degree of proximity to the estimation line-of-sight vector 42 to calculate a correction amount of rotation regarding the estimation line-of-sight vector 42.

The estimation line-of-sight vector 42 is corrected for (deflected) using a direction and a magnitude of the correction amount of rotation. Accordingly, a line-of-sight vector along the visual axis 58 (hereinafter referred to as a correction line-of-sight vector) is calculated.

Note that a method using coefficients obtained as indicated below is a general example of weight averaging: an inverse of an angle formed by a vector included in registered data and a calibration-target estimation line-of-sight vector 42 is obtained as a coefficient, and the obtained coefficients are normalized such that the sum of the obtained coefficients is one.

Moreover, details of the calibration processing are not limited, and, for example, any method that makes it possible to properly correct for the estimation line-of-sight vector 42 may be used.

The image processing section 28 generates an image displayed on the display 12. For example, the image processing section 28 acquires information regarding an application executed in the HMD 100, and generates an image of, for example, the virtual object 5 according to, for example, the progress of content, and a position and a pose of the head (the HMD 100) of a user.

Further, when, for example, an input operation is performed using a line of sight, a cursor or the like that indicates a gaze point is displayed on the basis of a correction line-of-sight vector calculated by the calibration processing section 27. Alternatively, when there is, for example, the virtual object 5 selected on the basis of the correction line-of-sight vector, the selected virtual object 5 is, for example, highlighted to be displayed to indicate that the object has been selected.

Moreover, the image processing section 28 can perform any display processing necessary for the operation of the HMD 100.

[Basic Operation of HMD 100]

Figure 7A:
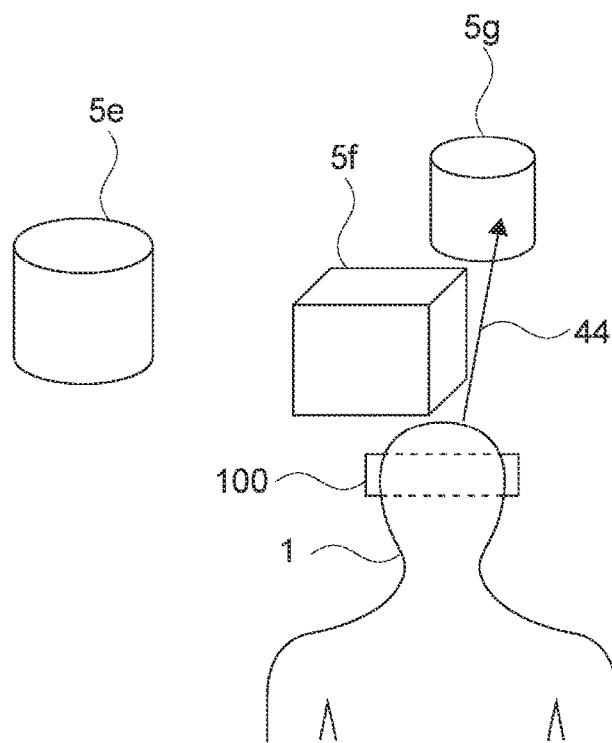
FIGS. 7A and 7B are schematic diagrams used to describe a basic operation of the HMD.
Figure 7B:
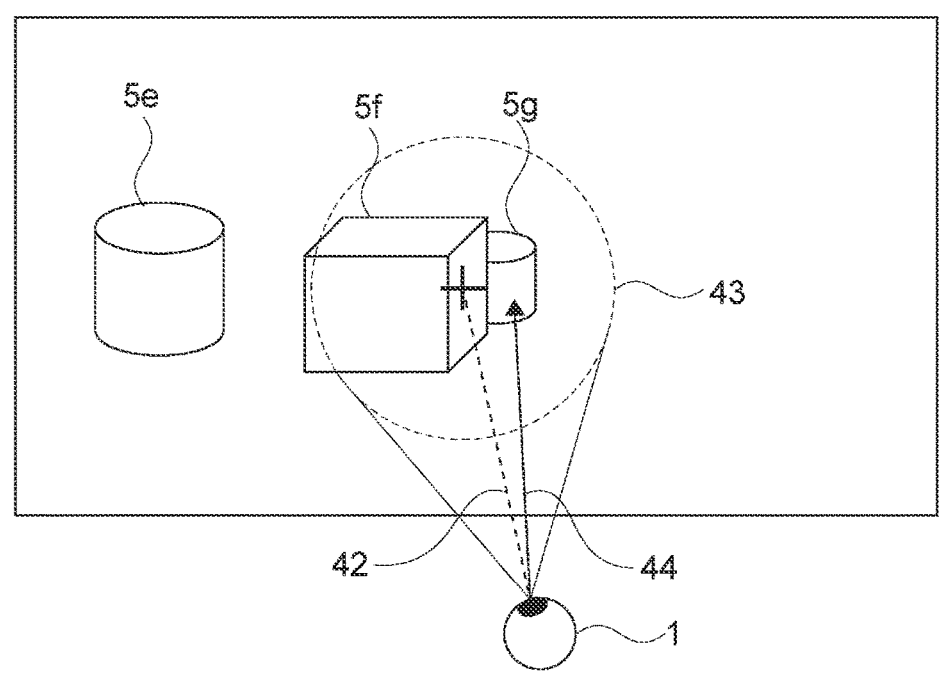

FIGS. 7A and 7B are schematic diagrams used to describe a basic operation of the HMD 100. FIG. 7A schematically illustrates the virtual object 5 displayed in a virtual space perceived by the user 1 wearing the HMD 100. FIG. 7B schematically illustrates the field of view 6 of the user 1 illustrated in FIG. 7A.

Here, the following environment is assumed: a plurality of virtual objects 5 is arranged in the virtual space, as illustrated in FIG. 7A, and the user 1 can freely change the orientation and the position in the virtual space.

Such an environment is provided as, for example, virtual reality (VR). Further, such an environment may also be provided as augmented reality (AR) or mixed reality (MR) in which an object in a real space (a real object) is mapped to a virtual space.

Virtual objects $5e$ to $5g$ are displayed in the virtual space illustrated in FIG. 7A. The virtual object $5e$ is arranged on the left as viewed from the user 1, and is situated away from a position in a direction of an actual line of sight of the user 1 (an actual-line-of-sight vector 44). The virtual object $5f$ is an object that is arranged generally in front of the user 1, and is situated close to the actual-line-of-sight vector 44. The virtual object $5g$ is an object that is arranged in the diagonally right rear of the virtual object $5f$ as viewed from the user 1, and that the user 1 is gazing at (toward which the actual-line-of-sight vector 44 is oriented).

Here, the virtual object $5g$ arranged in the right rear of the virtual object $5f$ partially hides behind the virtual object $5f$ in the field of view 6 of the user 1, as illustrated in FIG. 7B. When, as described above, there is a plurality of objects near the actual-line-of-sight vector 44 corresponding to a line of sight of the user 1, as viewed from the user 1, it may be difficult for an apparatus to determine which of the objects the user 1 is gazing at.

Even if an object that the user 1 is gazing at is determined, the determination may lack certainty, and an object that is different from an object that the user 1 is actually looking at may be determined to be a gaze target.

For example, in the example illustrated in FIG. 7B, a cylinder (the virtual object $5g$) on the right is a gaze target, but a rectangular parallelepiped (the virtual object $5f$) in the front may be selected.

Thus, a wrong object may be used as a reference when the calibration data 7 is generated during execution of, for example, an application.

In the HMD 100, the calibration data generator 26 determines whether an object parameter regarding at least one virtual object 5 within the target angular range 43 satisfies a specified condition. Then, it is determined whether to register the calibration data 7 in the calibration data store 21, on the basis of a result of the determination regarding the object parameter.

Specifically, when the object parameter satisfies the specified condition, the calibration data 7 is registered in the calibration data store 21. When the object parameter does not satisfy the specified condition, the calibration data 7 is not registered in the calibration data store 21.

The specified condition is set such that, for example, sufficiently highly probable (reliable) calibration data 7 can be selected.

The number of at least one virtual object within the target angular range 43 is used as the object parameter.

For example, it is conceivable that the percentage (the probability) of properly selecting a gaze-target virtual object 5 is reduced as the number of virtual objects 5 within the target angular range 43 is increased. Thus, for example, a condition that the calibration data 7 be registered when the number of virtual objects 5 is smaller than a specified number, is set.

Further, angular spacing of at least one virtual object 5 relative to the estimation line-of-sight vector 42 may be used as the object parameter. Here, for example, the angular spacing corresponds to an angle formed by the estimation line-of-sight vector 42 and a position vector of the virtual object 5, and corresponds to a magnitude of a correction amount of rotation.

For example, the virtual object 5 having large angular spacing is situated away from the estimation line-of-sight vector 42. Thus, it is conceivable that the probability that the user 1 is gazing at such a virtual object 5 is low. The condition may be set according to such characteristics.

Furthermore, a distance from a point of view to at least one virtual object 5 may be used as the object parameter. This distance is represented by, for example, a length of a position vector of the object.

For example, it is conceivable that the user 1 is more likely to gaze at the virtual object 5 displayed at a position closer to the user 1 in a virtual space. In this case, for example, a condition that the calibration data 7 based on the virtual object 5 closer to the user 1 be preferentially registered, is set.

Further, spacing of at least one virtual object 5 may be used as the object parameter. For example, it is conceivable that the probability of selecting a proper gaze target is decreased, for example, when a distance between adjacent virtual objects 5 is small or when a density of the virtual objects 5 is high.

Thus, for example, a condition that the calibration data 7 not be registered when spacing of the virtual objects 5 is smaller than a specified distance, is set.

Furthermore, the noticeability of at least one virtual object 5 may be used as the object parameter. The noticeability corresponds to properties that represent to what extent the virtual object 5 becomes a gaze target for the user 1 (a salience), such as whether the virtual object 5 is more likely to attract attention.

For example, it is conceivable that an object larger in appearance is more likely to attract attention than an object smaller in appearance, as viewed from a point of view of the user 1. Likewise, an object having a complicated shape or bright colors is likely to be a gaze target. Further, a moving object is more likely to be a gaze target than a stationary object.

For example, a condition that the virtual object 5 having the property of being likely to be a gaze target be preferentially registered as calibration data, may be set.

Further, information regarding a selection operation of selecting at least one virtual object 5 that is performed by the user 1 may be used as the object parameter. Here, the selection operation is an operation of selecting the virtual object 5 the user 1 is gazing at, and the selection operation is received by, for example, a button operation using a remote controller.

For example, the virtual object 5 for which the selection operation has been received is more likely to be a gaze target for the user 1. Thus, a condition that calibration data regarding the virtual object 5 for which a selection operation has been performed be registered in a data store, is set.

The types of the object parameters and the conditions set for the respective parameters are merely examples, and are not limited thereto.

Further, at least one of the conditions for the respective object parameters, or a combination of the conditions or the like may be used to perform processing of determining whether to register the calibration data 7. Moreover, a method for setting a condition used to register the calibration data 7 is not limited, and, for example, switching of the conditions may be performed to set the condition according to, for example, the type of application or the progress of content.

Further, in the present embodiment, the reliability of the calibration data 7 is calculated on the basis of the object parameter, and it is determined whether to register the calibration data 7 on the basis of the reliability.

The reliability is set according to a state of the virtual object 5 from which the calibration data 7 is generated. A parameter that represents the state of the virtual object 5 is an object parameter.

When a new data set (the calibration data 7) is added to the calibration data store 21, it is determined whether the new data set is allowed to be added according to the reliability. Further, the reliability is added to the data set.

In the present disclosure, the processing of determining whether to register the calibration data 7 using the reliability calculated on the basis of the object parameter is included in the processing of determining whether to register the calibration data 7 on the basis of the object parameter.

For example, as illustrated in FIG. 7B, the two virtual objects 5*f* and 5*g* may appear to overlap, as viewed from a point of view of the user 1. Here, it is assumed that the calibration data 7 being more likely to be a gaze target (for example, the virtual object 5*f* situated closer to the actual-line-of-sight vector 44) is registered in the calibration data store 21.

In this case, the calibration data 7 of the virtual object 5*f* is registered in the calibration data store 21. Since there are two candidate virtual objects 5, the reliability of the calibration data 7 is set to, for example, 0.5, with a maximum value being 1.

This makes it possible to accumulate new calibration data 7 with a low degree of reliability. Further, it is possible to deal with the calibration data 7, for example, using the reliability as an index, since the reliability is added to the calibration data 7.

As describe above, in the present embodiment, the reliability is used as an index that represents the quality of the calibration data 7. This makes it possible to increase the number of data points in the calibration data store 21, and to sufficiently prevent, for example, a reduction in the accuracy in detecting a line of sight that is caused by using the calibration data 7 with a low degree of reliability.

Figure 8:
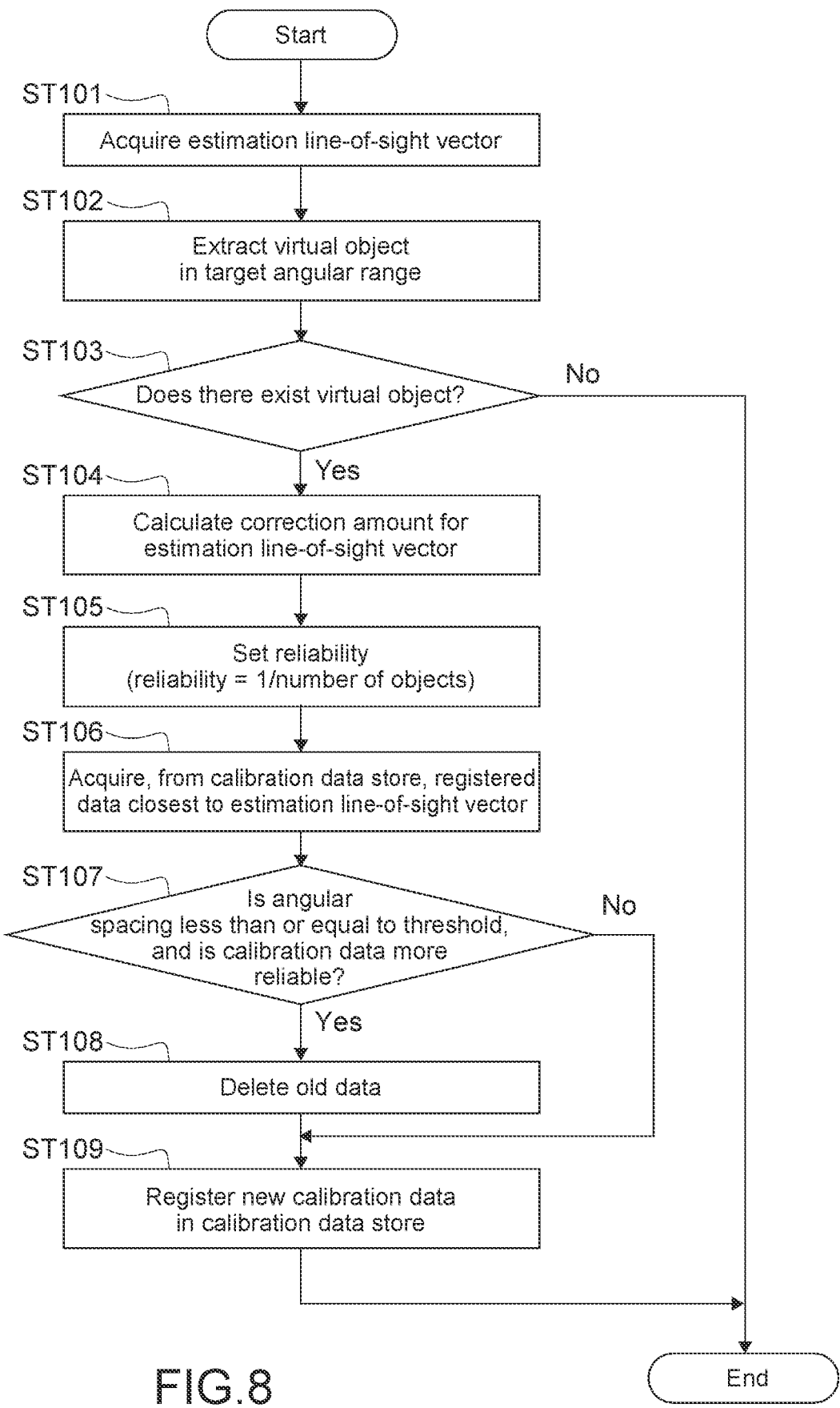
FIG. 8 is a flowchart illustrating an example of processing of generating calibration data.

FIG. 8 is a flowchart illustrating an example of the processing of generating the calibration data 7. The generation processing illustrated in FIG. 8 is an example of the second data-generation processing described with reference to FIG. 3B, and is, for example, loop processing repeatedly performed in a background during operation of, for example, an application.

First, the estimation line-of-sight vector 42 is calculated by the line-of-sight detector 23 (Step 101). For example, the estimation line-of-sight vector 42 (an optical-axis vector) representing the optical axis 56 of an eyeball of the user 1 is calculated from an eyeball model, on the basis of an eyeball image captured by the inward-oriented camera 14.

When the estimation line-of-sight vector 42 is calculated, the virtual object 5 within the target angular range 43 being set using the estimation line-of-sight vector 42 as a reference, is extracted by the object extraction section 25 (Step 102). Specifically, the virtual object 5 in a range formed by lines that respectively deviate from the estimation line-of-sight vector 42 by an angle of ten degrees is specified, and object information regarding the specified virtual object 5 is read.

At this point, object parameters such as the number of virtual objects 5 and a distance between the virtual objects 5 may be calculated.

It is determined whether the virtual object 5 is within the target angular range 43 (Step 103). When the virtual object 5 is not within the target angular range 43 (No in Step 103), that is, when there is no virtual object 5 near the line of sight of the user 1, the loop processing is performed again from Step 101.

When the virtual object 5 is within the target angular range 43 (Yes in Step 103), a correction amount for the estimation line-of-sight vector 42 is calculated by the calibration data generator 26 (Step 104).

Figure 9A:
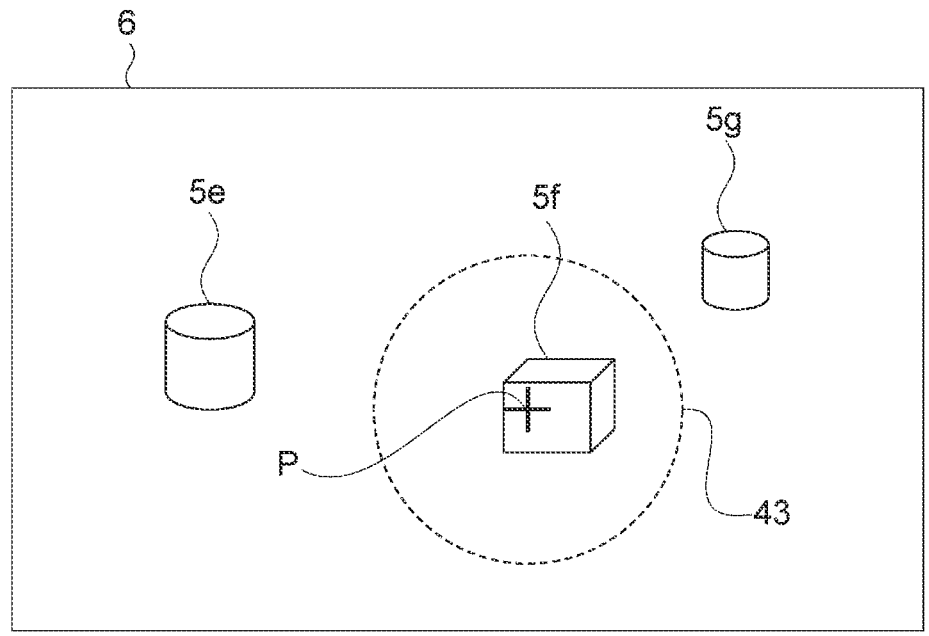
FIGS. 9A and 9B schematically illustrate an example of the field of view of a user.
Figure 9B:
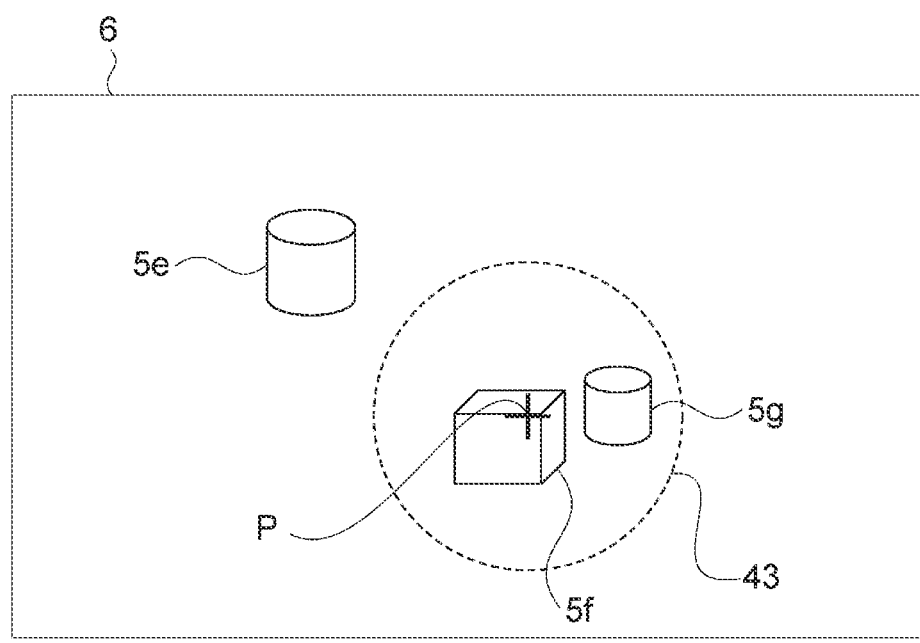

FIGS. 9A and 9B schematically illustrate an example of the field of view 6 of the user 1.

In FIG. 9A, one virtual object 5f is within the target angular range 43. In this case, the virtual object 5f is set to be a target object for which the calibration data 7 is calculated, and a correction amount for the estimation line-of-sight vector 42 is calculated on the basis of the virtual object 5f. When there is one virtual object 5 within a nearby range (the target angular range 43), a difference between a line in parallel with a direction toward the virtual object 5 and the estimation line-of-sight vector 42 is calculated as a correction angle (the correction amount), as described above.

Further, in FIG. 9B, a plurality of virtual objects 5 (two virtual objects 5f and 5g) is within the target angular range 43. In this case, for example, the virtual object 5 (the virtual object 5f in FIG. 7B) situated closest to the estimation line-of-sight vector 42 is set to be a target object for which the calibration data 7 is calculated, and a correction amount for the estimation line-of-sight vector 42 is calculated on the basis of the virtual object 5f.

In other words, the calibration data generator 26 calculates a correction amount on the basis of the virtual object 5 situated closest to the estimation line-of-sight vector 42 in the plurality of virtual objects 5 within the target angular range 43. When there is a plurality of virtual objects 5 in a nearby range, a difference between a line in parallel with a direction toward the nearest virtual object 5 and the estimation line-of-sight vector 42 is calculated as a correction angle (the correction amount), as described above.

Returning to FIG. 8, when the correction amount is calculated, the reliability is set by the calibration data generator 26 (Step 101).

When there is one virtual object 5 within the target angular range 43, as illustrated in FIG. 9A, the reliability is set to 1.

Further, when a plurality of virtual objects 5 is within the target angular range 43, as illustrated in FIG. 9B, the reliability is set to 1/n. Here, n is the number of virtual objects 5 within the target angular range 43.

For example, when there are two virtual objects 5, the reliability is set to ½, that is, 0.5. Thus, for example, the reliability of (a correction amount for) the calibration data 7 generated on the basis of the virtual object 5f illustrated in FIG. 9B is 0.5.

As described above, in the present embodiment, when a plurality of virtual objects 5 is within the target angular range 43, the reliability is set higher if the number of the plurality of virtual objects 5 within the target angular range 43 is smaller, and the reliability is set lower if the number of the plurality of virtual objects 5 within the target angular range 43 is larger.

For example, when the user 1 is actually looking at the virtual object 5g, the calibration data 7 based on the virtual object 5f will be wrong data.

Even in such a case, when the reliability is set low, this makes it possible to sufficiently reduce an effect of the wrong calibration data 7 on actual calibration processing.

When the reliability is set, registered data (registered calibration data) closest to the estimation line-of-sight vector 42 is acquired from the calibration data store 21 (Step 106). For example, registered data, in the calibration data store 21, in which angular spacing of the estimation line-of-sight vector 42 and a vector of the registered data is smallest, is retrieved to be read.

When the registered data has been acquired, it is determined, by the calibration data generator 26, whether to register the calibration data 7 (Step 107). Specifically, it is determined whether an object parameter and reliability that are obtained when the calibration data 7 is calculated satisfy specified conditions.

In the example illustrated in FIG. 8, it is determined whether angular spacing of the estimation line-of-sight vector 42 and a vector of registered data is less than or equal to a threshold, and whether new calibration data 7 is more reliable than the registered data. In the present embodiment, a threshold related to angular spacing corresponds to a second threshold.

When the angular spacing relative to the registered data is less than the threshold, the estimation line-of-sight vector 42 is determined to be a vector sufficiently close to the already registered vector. When the angular spacing is less than the threshold and the new calibration data 7 is more reliable than the registered data (Yes in Step 107), the old registered data is deleted (Step 108), and the new calibration data 7 is registered in the calibration data store 21 (Step 109).

In other words, when a vector of one of pieces of already registered data is close to the estimation line-of-sight vector 42 upon registering new calibration data 7, the reliability of the already registered data is compared with the reliability of the new calibration data 7. When the new data is more reliable, the already registered data is deleted, and the new calibration data 7 is added.

Conversely, when the registered data is more reliable, the calibration data 7 is not added.

As described above, in the present embodiment, registered data that includes a vector in which angular spacing of the vector and the estimation line-of-sight vector 42 is less than or equal to a threshold, is extracted. When the calibration data 7 is more reliable than the registered data, the registered data is deleted from the calibration data store 21, and the calibration data 7 is registered in the calibration data store 21.

This makes it possible to accumulate more reliable calibration data in the calibration data store 21. This results in being able to improve the reliability of the calibration data store 21, and thus to improve the accuracy in detecting a line of sight.

Note that when the angular spacing relative to the registered data is greater than the threshold (No in Step 107), it is determined that registered data that is close to the estimation line-of-sight vector 42 of the calibration data 7 does not exist in the calibration data store 21. In such a case, the calibration data 7 is registered in the calibration data store 21 without performing the process of Step 108, regardless of a value of the reliability.

This makes it possible to increase the number of data points newly registered.

When registration of the calibration data 7 is completed, the processes of and after Step 101 are performed again. As described above, in the HMD 100, the calibration data 7 is also accumulated during execution of, for example, an application. This makes it possible to keep on properly detecting a line of sight when, for example, the mounting position of the apparatus is shifted, and thus to improve the reliability of the apparatus.

In the description above, registration of the calibration data 7 is determined by comparing the reliability of registered data with the reliability of the calibration data 7. For example, a threshold related to the reliability may be provided when the calibration data 7 is added, and setting may be performed such that the calibration data 7 of which the reliability is less than or equal to the threshold is not registered. In the present embodiment, the threshold related to the reliability corresponds to a first threshold.

For example, when registered data that is close to newly generated calibration data 7 (data for which angular spacing is greater than a threshold) does not exist, it is determined whether the reliability of the calibration data 7 is greater than a threshold (for example, 0.1).

When the reliability is greater than the threshold, the calibration data 7 is registered in the calibration data store 21 as data that can be used to perform calibration processing.

On the other hand, when the reliability is less than the threshold, an erroneous line-of-sight detection may be performed by using the calibration data 7. Thus, the calibration data 7 of which the reliability is less than the threshold is discarded without being registered.

As described above, the calibration data generator 26 does not register the calibration data 7 in the calibration data store 21 at least when the reliability is less than the threshold. This makes it possible to maintain the reliability of the entirety of the calibration data store 21 at a high level.

Note that the threshold related to the reliability may be controlled according to the number of pieces of registered data.

For example, when the number of pieces of existing registered data is small, the threshold related to the reliability may be made lower. This makes it possible to increase the number of pieces of calibration data 7 registered in the calibration data store 21, and to enrich the database.

Further, when the number of pieces of registered data is large, the threshold related to the reliability may be made higher. This makes it possible to avoid registering the calibration data 7 with a low degree of reliability, and thus to maintain the reliability of the calibration data store 21 at a high level.

The example in which an inverse of the number of virtual objects 5 within the target angular range 43 is set to be the reliability has been described above. The method for setting the reliability is not limited, and, for example, the reliability may be set using, for example, another object parameter related to the virtual object 5.

Other methods for setting the reliability are described below.

For example, it is assumed that a plurality of virtual objects 5 is within the target angular range 43, as illustrated in FIG. 9B. Here, spacing of the virtual objects 5 included in the plurality of virtual objects 5 may be used as the object parameter used to set the reliability.

In this case, the reliability is set higher if the spacing of the virtual objects is smaller. In other words, when the virtual objects 5 are closely displayed, it is determined that a difference from an object that a user is actually looking at is more likely to be small, and thus the reliability is set high. Conversely, the reliability is set lower if the spacing of the respective virtual objects 5 is larger.

Further, for example, angular spacing of at least one virtual object 5 relative to the estimation line-of-sight vector 42 may be used as the object parameter used to set the reliability.

In this case, the reliability is set higher if the angular spacing is smaller. In other words, the reliability is set higher if the virtual object 5 is situated closer to the estimation line-of-sight vector 42. Conversely, the reliability is set lower if the angular spacing is larger.

Further, for example, a distance from a point of view to at least one virtual object 5 may be used as the object parameter used to set the reliability.

In this case, the reliability is set higher if the distance from the point of view is smaller. In other words, the reliability is set higher if the virtual object 5 is situated closer to the user 1. Conversely, the reliability is set lower if the distance from the point of view is larger.

Further, for example, the noticeability of at least one virtual object 5 may be used as the object parameter used to set the reliability.

For example, a higher reliability is set for a red virtual object 5 than a gray virtual object 5. Further, a higher reliability is set for the virtual object 5 larger in appearance, as viewed from a user. Furthermore, a higher reliability is set for a moving virtual object 5 than a stationary virtual object 5.

Furthermore, information regarding a selection operation of selecting at least one virtual object 5 that is performed by the user 1 may be used as the object parameter used to set the reliability.

For example, when the selection operation is performed by an operation other than the operation using a line of sight (such as a button operation using a controller), and when a gaze target that the user 1 is gazing at has been specified, the reliability may be set to 1 even if there is a plurality of virtual objects 5 near the estimation line-of-sight vector 42.

As described above, the reliability of calibration data calculated on the basis of the virtual object 5 selected by the selection operation being performed, is set to a maximum value. This enables highly reliable calibration data to be registered with certainty.

Moreover, the reliability may be set by combining the object parameters.

Note that the calibration data 7 with a relatively low degree of reliability may be registered in the calibration data store 21. With respect to the calibration data 7 with a low degree of reliability, weighting is performed according to a distance upon performing calibration processing, and weight-averaging is performed in consideration of the reliability. This makes it possible to reduce an effect on the calibration processing.

For example, when a correction amount for the calibrating data 7 with a low degree of reliability is applied, the correction amount (an amount of rotation) is set small and combined with a correction amount for other calibration data 7. This makes it possible to, for example, avoid greatly deflecting the estimation line-of-sight vector 42 in a wrong direction upon the calibration processing.

The example in which the calibration data 7 is generated on the basis of the virtual object 5 situated closest to the estimation line-of-sight vector 42 in the virtual objects 5 within the target angular range 43, has been described above.

Without being limited thereto, pieces of calibration data may be generated for all of the virtual objects 5 within the target angular range 43. In this case, correction amounts corresponding to the respective virtual objects 5 of a plurality of virtual objects 5 are calculated by the calibration data generator 26 on the basis of the respective virtual objects 5 of the plurality of virtual objects 5.

For example, in the example illustrated in FIG. 9B, a correction amount for the estimation line-of-sight vector 42 is calculated on the basis of the virtual object 5f, and a correction amount for the estimation line-of-sight vector 42 is calculated on the basis of the virtual object 5g. Then, calibration data in which the calculated correction amount and the estimation line-of-sight vector 42 are associated with each other, is generated for each correction amount.

At this point, the reliability of each piece of the calibration data 7 is calculated. For example, the reliability of the calibration data 7 based on the virtual object 5f is set higher than the reliability of the calibration data 7 based on the virtual object 5g.

When the reliability is calculated, the processing of determining whether to register the pieces of calibration data 7 in the calibration data store 21 is performed for each piece of calibration data 7 on the basis of the reliability of the corresponding calibration data 7 and the object parameter.

As described above, when a plurality of virtual objects 5 is within a certain target angular range 43, a plurality of pieces of calibration data 7 may be generated at the same time, and it may be determined whether each of the plurality of pieces of calibration data 7 is allowed to be registered in the calibration data store 21. This makes it possible to efficiently accumulate the calibration data 7.

Figure 10A:
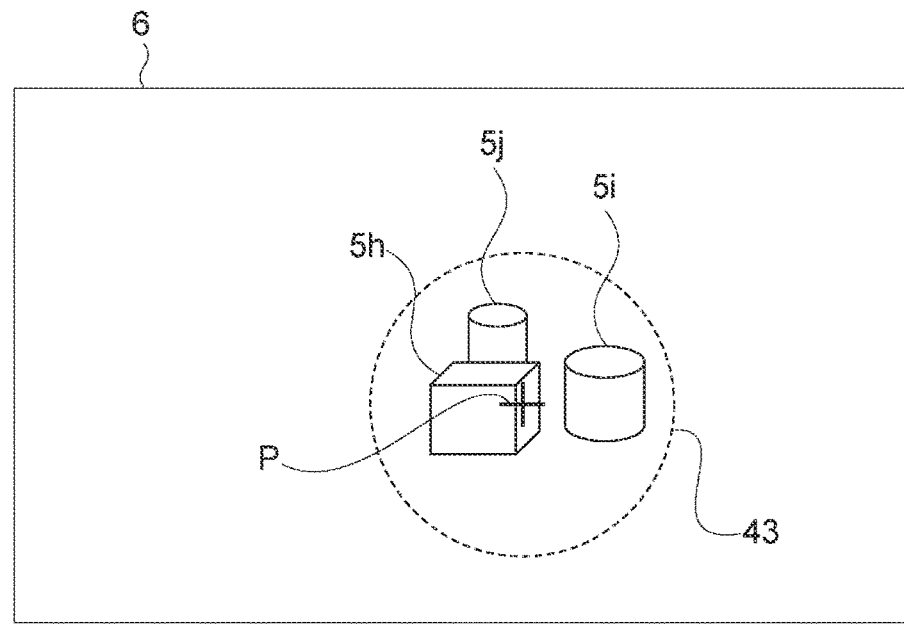
FIGS. 10A and 10B schematically illustrate an example of setting an angular range.
Figure 10B:
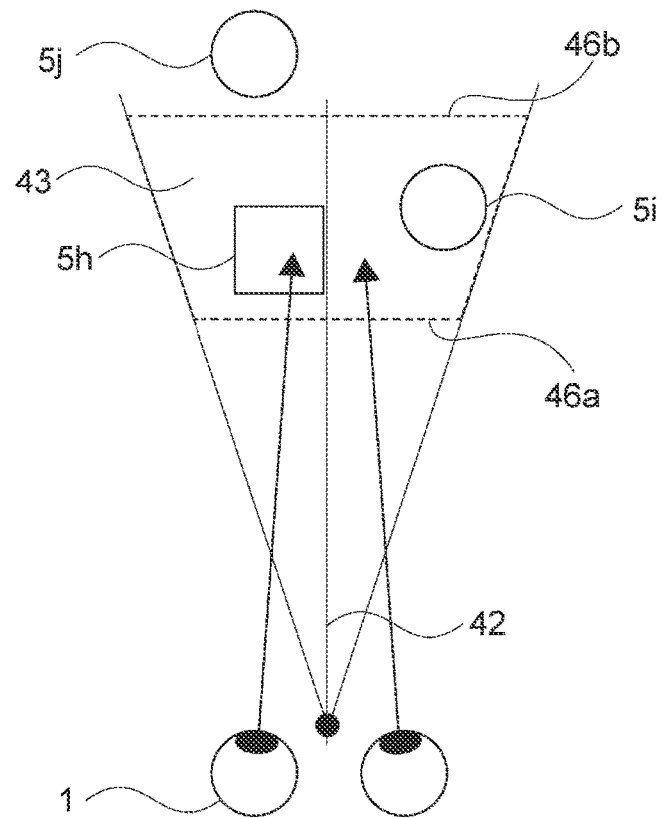

FIGS. 10A and 10B schematically illustrate an example of setting an angular range of FIG. 10A is a front view illustrating the target angular range 43 in the field of view 6 of the user 1. FIG. 10B is a top view of the target angular range 43 illustrated in FIG. 10A, as viewed from above. Here, a method for setting the target angular range 43 partitioned in a depth direction is described.

In the example illustrated in FIGS. 10A and 10B, the target angular range 43 of a conical region partitioned in the depth direction is set. Specifically, two boundary planes 46a and 46b are set in the conical region to be orthogonal to a central axis. As viewed from the user 1, the boundary plane 46a is set in front, and the boundary plane 46b is set in back. Thus, the target angular range 43 is a region surrounded by the boundary planes 46a and 46b, and a conical surface.

In FIG. 10B, the boundary planes 46a and 46b are set on the basis of a position of a gaze point in the depth direction (a gaze distance), the gaze point being a point that the user 1 is gazing at. The position of the gaze point can be calculated on the basis of, for example, a distance to an object and an angle of convergence that is formed by the left and right lines of sight of the user 1.

When the position of the gaze point P is calculated, the boundary plane 46a in front and the boundary plane 46b in back are set such that the gaze point is situated between the boundary planes 46a and 46b. As described above, in FIGS. 10A and 10B, the boundary planes 46a and 46b are set in the depth direction of the target angular range 43 on the basis of an angle of convergence that is formed by lines of sight of the user 1.

In of FIGS. 10A and 10B, virtual objects 5h to 5j are displayed. The virtual object 5h is arranged to be shifted to the left from the front of the user 1, and the virtual object 5i is arranged at substantially the same depth as the virtual object 5h to be shifted to the right from the front of the user 1. Further, the virtual object 5j is arranged behind the virtual object 5j.

As illustrated in FIG. 10A, the virtual objects 5h to 5j appear to be within the target angular range 43 (a circular range) in the field of view 6 of the user 1. It is assumed that, at this point, the user 1 pays attention to a region near the virtual object 5h arranged in front.

For example, an approximate range in which there exists a gaze point of the user 1 is calculated from an angle of convergence (an angle formed by the left and right lines of sight). Further, the positions of the virtual objects 5h and 5i being situated near the gaze point are referred to, and the position of the gaze point is estimated.

The positions of the boundary planes 46a and 46b in the depth direction are set such that the gaze point P estimated as described above is within the target angular range 43.

Consequently, the target angular range 43 is set such that the virtual objects 5h and 5i are within the target angular range 43, as illustrated in FIG. 10B, and the number of objects actually within the target angular range 43 is two.

The above-described setting of the target angular range 43 makes it possible to reduce the number of candidate virtual objects 5 from which the calibration data 7 is generated. This results in being able to generate the calibration data 7 with a high degree of reliability, compared to when, for example, the boundary planes 46a and 46b are not set.

The method for setting the boundary planes 46a and 46b is not limited. For example, when a region (such as a region in which the virtual object 5 appears, and a working region) to which the user 1 pays attention has been detected in advance, the boundary planes 46a and 46b may be set according to the detected region. Further, for example, only one of the boundary planes 46a and 46b may be set.

Figure 11A:
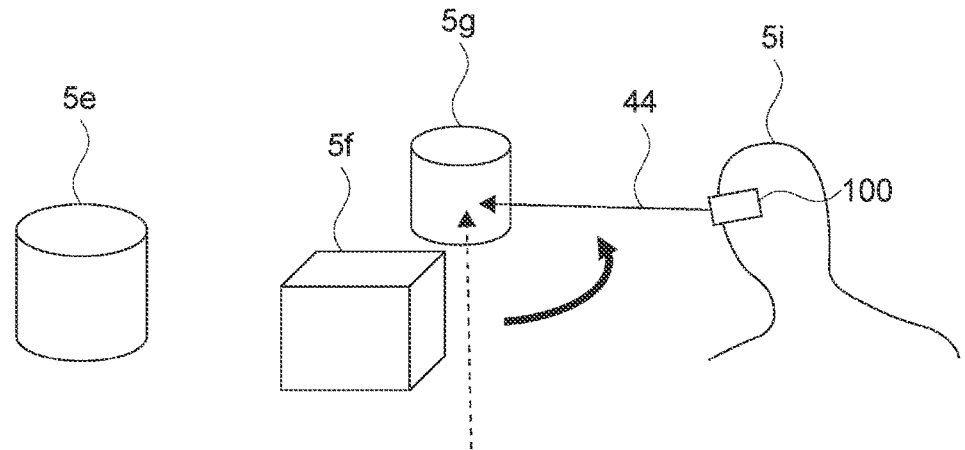
FIGS. 11A, 11B, and 11C are schematic diagrams used to describe a change in the field of view that is caused due to the movement of a point of view.
Figure 11B:
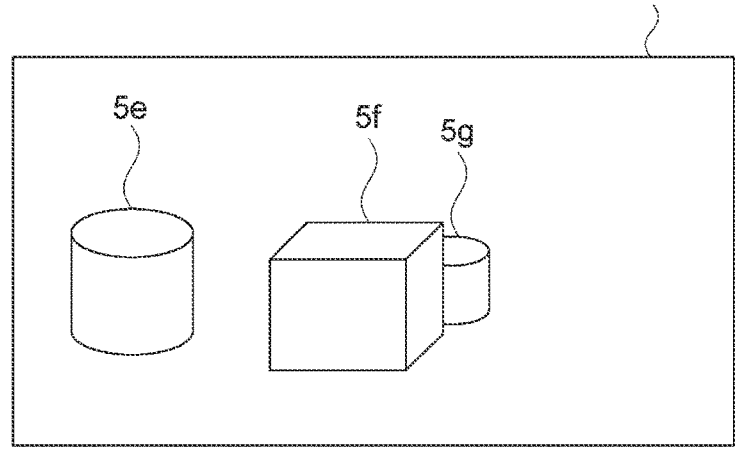
Figure 11C:
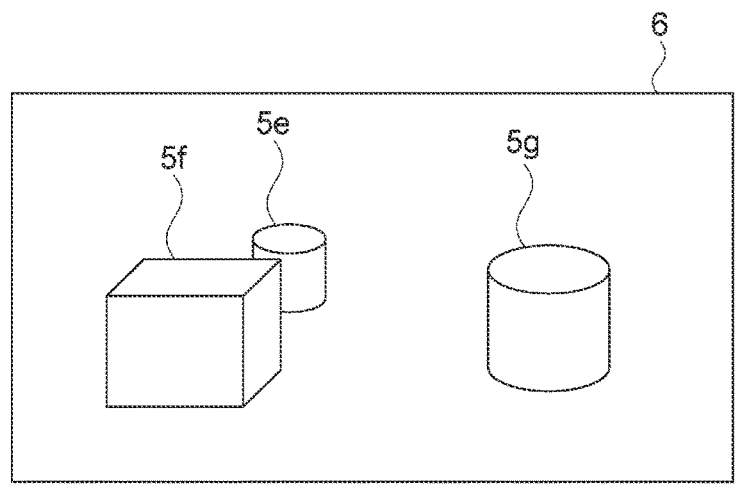

FIGS. 11A, 11B, and 11C are schematic diagrams used to describe a change in the field of view 6 that is caused due to the movement of a point of view. In FIGS. 11A, 11B, and 11C, the virtual objects 5e to 5g are displayed by being localized in a virtual space in the arrangement illustrated in FIGS. 7A and 7B. In FIG. 11A, the user 1 moves around to the right from the state illustrated in FIGS. 7A and 7B to gaze at the virtual object 5g. Further, FIGS. 11B and 11C respectively schematically illustrate the field of view 6 of the user 1 before and after the movement.

As illustrated in of FIGS. 11B and 11C, the position of the virtual object 5 in appearance (the position of the virtual object 5 in the field of view 6 of the user 1) is changed due to the movement of the user 1 when the virtual object 5 is displayed as an object in a virtual space.

For example, in the field of view 6 before the movement illustrated in FIG. 11B, there is the virtual object 5f near the virtual object 5g to which the user 1 pays attention. Here, when the user moves around to the right, an object (the virtual object 5f) other than the virtual object 5g is no longer displayed near the virtual object 5g in the field of view 6 after the movement, as illustrated in FIG. 11C.

The above-described movement of the user 1 makes it possible to, for example, accumulate new calibration data 7 with a reliability of 1, on the basis of the virtual object 5g.

Here, the new calibration data 7 may be simply added, or, when a direction of a vector of the less reliable calibration data 7 (registered data) registered before the movement is close to a direction of the estimation line-of-sight vector 42 of new calibration data 7, the old calibration data 7 may be deleted.

As described above, the pieces of calibration data 7 with a high degree of reliability can be accumulated one after another in the HMD 100. Further, when calibration data with a low degree of reliability is newly generated near registered data with a high degree of reliability, comparison regarding, for example, the reliability is performed, and the less reliable calibration data can be discarded. This makes it possible to sufficiently prevent a reduction in the accuracy in detecting a line of sight.

As described above, the estimation line-of-sight vector 42 obtained by estimating a direction of a line of sight of the user 1, and a correction amount regarding the estimation line-of-sight vector 42 are calculated in the controller 17 according to the present embodiment. The correction amount is calculated on the basis of at least one virtual object 5 within the target angular range 43 set using the estimation line-of-sight vector 42 as a reference. Further, it is determined whether the calibration data 7 in which the estimation line-of-sight vector 42 and the correction amount are associated with each other is to be registered in the calibration data store 21, on the basis of an object parameter related to the at least one virtual object 5. This makes it possible to accumulate the proper calibration data 7, and thus to prevent a reduction in the accuracy in detecting a line of sight.

Other Embodiments

The present technology is not limited to the embodiments described above, and can achieve various other embodiments.

The method for registering the calibration data 7 has been primarily described in the embodiments above. For example, when newly registered calibration data 7 is low-accuracy data, processing of canceling the registration of the calibration data 7 may be performed.

For example, it is assumed that new calibration data 7 is registered when the user 1 is performing an input operation using a line of sight, and the estimation line-of-sight vector 42 is corrected for using the calibration data 7. In this case, if the new calibration data 7 is set on the basis of a wrong object, there may be a reduction in the accuracy in correcting for the estimation line-of-sight vector 42 (the accuracy in detecting a line of sight), and an error or the like may be caused when an input operation is performed by the user 1.

In this case, the user 1 is more likely to perform, for example, a cancellation operation of canceling the input operation using a line of sight. For example, if a word input is performed using a line of sight and if a word input is erroneously performed, a most recently performed word input will be canceled by a cancellation operation of selecting, for example, a backspace key or a delete key. Further, when an operation of locking a target is erroneously performed in, for example, a shooting game, an operation of canceling the locking operation is performed.

When such a cancellation operation is performed, it is determined that, for example, the calibration data 7 registered just before the cancellation operation is performed is more likely to be data based on a wrong object, and thus the registration of the corresponding calibration data 7 is canceled.

Specifically, the calibration data 7 is deleted from the calibration data store 21. Further, when, for example, other registered data is deleted at the time of registering the calibration data 7, processing of returning the deleted registered data to the calibration data store 21 is performed.

As described above, the registration of the calibration data 7 in the calibration data store 21 may be canceled in response to a cancellation operation being performed by the user 1. This makes it possible to correct for registration of, for example, wrong calibration data 7, and to maintain the reliability of the calibration data store 21.

In the embodiments described above, the calibration data 7 used to correct for the estimation line-of-sight vector 42 obtained by estimating the optical axis 56 of an eyeball is generated. For example, a line-of-sight direction calibrated using calibration data generated by a static calibration (the first data-generation processing) may be dynamically corrected for using calibration data generated by a dynamic calibration (the second data-generation processing). In this case, calibration data used to dynamically correct for a calibrated line-of-sight vector is generated.

Note that the line-of-sight vector having been calibrated once is considered a vector that is oriented toward a direction close to a direction of the visual axis 58. Thus, a target angular range can be set small.

The present technology can also be applied when data used to further calibrate such a calibrated line-of-sight vector is accumulated.

The HMD 100 of an immersive type has been primarily described in the embodiments above. The present technology can be applied to any apparatus that can detect a line-of-sight vector of the user 1.

For example, an optically transmissive HMD may be used. In this case, a line-of-sight vector of the user 1 is calculated using, for example, an inward-oriented camera included in the HMD. Further, information regarding a real space is acquired using, for example, an external camera. The optically transmissive HMD makes it possible to superimpose a virtual object on a real space such that it looks like the virtual object exists in the real space, on the basis of three-dimensional coordinates in the real space, that is, a global coordinate system. The use of an optically transmissive HMD enables the user 1 to experience, for example, an AR space.

Further, for example, an input operation using a line of sight may be performed using a display apparatus such as a display of a personal computer (PC), a stationary monitor used, for example, in medical practice, or a TV. In this case, a line-of-sight vector of the user 1 viewing, for example, a display of a PC is calculated using, for example, a camera that captures an image of a face (an eyeball) of the user 1.

Furthermore, for example, the present technology can also be applied when, for example, an electronic viewfinder (EVF) that is included in, for example, an image-capturing apparatus and includes a function of detecting a line of sight of a single eye; or eyeglass-type line-of-sight detection device without a display is used.

In the case of an apparatus that detects a line of sight while causing a user to observe a real space, as described above, an object in a real space (a real object) is detected, and the detected object is mapped to a virtual space. This makes it possible to apply processing similar to the above-described processing performed by, for example, the HMD 100. For example, an image recognition technology such as semantic segmentation or an object detection technology that uses color information and depth information can be used as a method for detecting a real object.

The example in which the information processing method according to the present technology is performed by a computer such as the HMD 100 being operated by the user 1, has been described above. However, the information processing method and the program according to the present technology may be executed by a computer operated by the user 1 and by another computer with which communication can be performed through, for example, a network. Further, a content providing system according to the present technology may be constructed by the computer operated by the user 1 and the other computer working cooperatively.

In other words, the information processing method and the program according to the present technology can be executed not only in a computer system that includes a single computer, but also in a computer system in which a plurality of computers operates cooperatively. Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the information processing method and the program according to the present technology by the computer system includes, for example, both the case in which the calculation of an estimation vector, the calculation of a correction amount, the determination of whether to register calibration data in a data store, and the like are executed by a single computer; and the case in which the respective processes are executed by different computers. Further, the execution of each process by a specified computer includes causing another computer to execute a portion of or all of the process and acquiring a result of it.

In other words, the information processing method and the program according to the present technology can also be applied to a configuration of cloud computing in which a single function is shared and cooperatively processed by a plurality of apparatuses through a network.

At least two of the features of the present technology described above can also be combined. In other words, various features described in the respective embodiments may be combined discretionarily regardless of the embodiments. Further, the various effects described above are not limitative but are merely illustrative, and other effects may be provided.

In the present disclosure, expressions such as "same", "equal", and "orthogonal" include, in concept, expressions such as "substantially the same", "substantially equal", and "substantially orthogonal". For example, the expressions such as "same", "equal", and "orthogonal" also include states within specified ranges (such as a range of +/−10%), with expressions such as "exactly the same", "exactly equal", and "completely orthogonal" being used as references.

Note that the present technology may also take the following configurations.

(1) An information processing apparatus, including:
 a line-of-sight estimator that calculates an estimation vector obtained by estimating a direction of a line of sight of a user;
 a correction amount calculator that calculates a correction amount related to the estimation vector on the basis of at least one object that is within a specified angular range that is set using the estimation vector as a reference; and
 a registration determination section that determines whether to register, in a data store, calibration data in which the estimation vector and the correction amount are associated with each other, on the basis of a parameter related to the at least one object within the specified angular range.

(2) The information processing apparatus according to (1), in which
 the registration determination section determines whether the parameter related to the at least one object satisfies a specified condition,
 when the parameter satisfies the specified condition, the registration determination section registers the calibration data in the data store, and
 when the parameter does not satisfy the specified condition, the registration determination section does not register the calibration data in the data store.

(3) The information processing apparatus according to (1) or (2), in which
 the parameter related to the at least one object includes at least one of the number of the at least one object within the specified angular range, angular spacing of the at least one object relative to the estimation vector, a distance from a point of view to the at least one object, spacing of the at least one object, noticeability of the at least one object, or information regarding a selection operation of selecting the at least one object that is performed by the user.

(4) The information processing apparatus according to any one of (1) to (3), in which
 the registration determination section sets reliability of the calibration data on the basis of the parameter related to the at least one object, and
 on the basis of the reliability, the registration determination section determines whether to register the calibration data in the data store.

(5) The information processing apparatus according to (4), in which
 the registration determination section generates, as the calibration data, a data set in which the estimation vector, the correction amount, and the reliability are associated with each other.

(6) The information processing apparatus according to (4) or (5), in which
 the at least one object includes a plurality of objects,
 the parameter includes the number of the plurality of objects, and
 the registration determination section sets the reliability higher when there is a smaller number of the plurality of objects within the specified angular range.

(7) The information processing apparatus according to any one of (4) to (6), in which
 the at least one object includes a plurality of objects,
 the parameter includes spacing of the plurality of objects, and the registration determination section sets the reliability higher when the spacing of the plurality of objects is smaller.

(8) The information processing apparatus according to any one of (4) to (7), in which
the parameter related to the at least one object includes angular spacing of the at least one object relative to the estimation vector, and
the registration determination section sets the reliability higher when the angular spacing is smaller.

(9) The information processing apparatus according to any one of (4) to (8), in which
the parameter related to the at least one object includes information regarding a selection operation of selecting the at least one object that is performed by the user, and
the registration determination section sets, to a maximum value, the reliability of the calibration data calculated on the basis of the at least one object selected by the selection operation being performed.

(10) The information processing apparatus according to any one of (4) to (9), in which
at least when the reliability is less than a first threshold, the registration determination section does not register the calibration data in the data store.

(11) The information processing apparatus according to (10), in which
the data store includes a plurality of pieces of registered data that corresponds to the pieces of registered calibration data, and
the registration determination section controls the first threshold according to the number of the pieces of registered data.

(12) The information processing apparatus according to any one of (4) to (11), in which
the data store includes a plurality of pieces of registered data that corresponds to the pieces of registered calibration data,
the registration determination section extracts the piece of registered data including a vector in which angular spacing of the vector and the estimation vector is less than or equal to a second threshold, and
when the reliability is higher than reliability of the piece of registered data, the registration determination section deletes the piece of registered data from the data store, and registers the piece of calibration data having a higher reliability in the data store.

(13) The information processing apparatus according to any one of (1) to (12), in which
the at least one object includes a plurality of objects, and
the correction amount calculator calculates the correction amount on the basis of an object that is situated closest to the estimation vector in the plurality of objects.

(14) The information processing apparatus according to any one of (1) to (12), in which
the at least one object includes a plurality of objects, and
the correction amount calculator calculates the correction amounts corresponding to respective objects of the plurality of objects on the basis of the respective objects of the plurality of objects.

(15) The information processing apparatus according to any one of (1) to (14), in which
the registration determination section cancels registration of the calibration data in the data store in response to a cancellation operation being performed by the user.

(16) The information processing apparatus according to any one of (1) to (15), in which
the estimation vector is a vector obtained by estimating an optical axis of an eyeball of the user, and
the correction amount calculator sets, to be the specified angular range, a range having a shape of a cone that has an apex angle of 20 degrees or less, with the estimation vector being a central axis of the cone.

(17) The information processing apparatus according to any one of (1) to (16), in which
the correction amount calculator sets a boundary plane in a depth direction of the specified angular range on the basis of an angle of convergence that is formed by the lines of sight of the user.

(18) An information processing method, including:
calculating, by a computer system, an estimation vector obtained by estimating a direction of a line of sight of a user;
calculating, by the computer system, a correction amount related to the estimation vector on the basis of at least one object that is within a specified angular range that is set using the estimation vector as a reference; and
determining, by the computer system, whether to register, in a data store, calibration data in which the estimation vector and the correction amount are associated with each other, on the basis of a parameter related to the at least one object within the specified angular range.

(19) A computer-readable recording medium that records therein a program that causes a process to be performed, the process including:
calculating an estimation vector obtained by estimating a direction of a line of sight of a user;
calculating a correction amount related to the estimation vector on the basis of at least one object that is within a specified angular range that is set using the estimation vector as a reference; and
determining whether to register, in a data store, calibration data in which the estimation vector and the correction amount are associated with each other, on the basis of a parameter related to the at least one object within the specified angular range.

REFERENCE SIGNS LIST 1 user
5, 5a to 5j virtual object
6 field of view
7 calibration data
16 storage
17 controller
20 control program
21 calibration data store
22 object information
23 line-of-sight detector
24 position-and-pose-of-head detector
25 object extraction section
26 calibration data generator
27 calibration processing section
28 image processing section
42 estimation line-of-sight vector
43 target angular range
44 actual-line-of-sight vector
100 HMD

The invention claimed is:

1. An information processing apparatus, comprising:
a line-of-sight estimator configured to:
determine a direction of a line of sight; and
calculate an estimation vector based on the direction of the line of sight;
a correction amount calculator configured to:
set a specific angular range based on the estimation vector as a reference; and
calculate a correction amount, associated with the estimation vector, based on at least one object, of a plurality of objects, that is within the specific; and
a registration determination section configured to:
generate calibration data that includes each of the estimation vector, and the correction amount associated with the estimation vector; and
control, based on a parameter associated with the at least one object, a registration of the generated calibration data in a data store.

2. The information processing apparatus according to claim 1, wherein
the registration determination section is further configured to:
determine the parameter, associated with the at least one object, one of satisfies a specific condition or fails to satisfy the specific condition;
control the registration of the generated calibration data based on the determination that the parameter one of satisfies the specific condition or fails to satisfy the specific condition;
in a case where the parameter satisfies the specific condition, register the calibration data in the data store; and
in a case where the parameter fails to satisfy the specific condition, discard the registration of the calibration data in the data store.

3. The information processing apparatus according to claim 1, wherein
the parameter, associated with the at least one object, includes at least one of a number of the at least one object within the specific angular range, an angular spacing of the at least one object with respect to the estimation vector, a distance from a point of view to the at least one object, a spacing between each object of the plurality of objects, a noticeability of the at least one object, or information associated with a user selection of the at least one object, and
the noticeability of the at least one object indicates a degree of salience of the at least one object with respect to a user.

4. The information processing apparatus according to claim 1, wherein
the registration determination section is further configured to:
set a reliability of the calibration data based on the parameter associated with the at least one object; and
control, based on the reliability, the registration of the calibration data in the data store.

5. The information processing apparatus according to claim 4, wherein
the registration determination section is further configured to generate, as the calibration data, a data set in which the estimation vector, the correction amount, and the reliability are associated.

6. The information processing apparatus according to claim 4, wherein
the parameter includes one of:
a first number of objects, of the plurality of objects, within the specific angular range, or
a second number of objects, of the plurality of objects, within the specific angular range,
the registration determination section is further configured to:
determine the parameter includes one of the first number of objects or the second number of objects;
in a case where the parameter includes the first number of objects, set the reliability as a first reliability; and
in a case where the parameter includes the second number of objects, set the reliability as a second reliability,
the first number of objects is smaller than the second number of objects, and
the first reliability is higher than the second reliability.

7. The information processing apparatus according to claim 4, wherein
the parameter includes one of a first spacing between the plurality of objects or a second spacing between the plurality of objects,
the registration determination section is further configured to:
determine the parameter includes one of the first spacing or the second spacing;
in a case where the parameter includes the first spacing, set the reliability as a first reliability; and
in a case where the parameter includes the second spacing, set the reliability as a second reliability,
the first spacing is smaller than the second spacing, and
the first reliability is higher than the second reliability.

8. The information processing apparatus according to claim 4, wherein
the parameter, associated with the at least one object, includes one of a first angular spacing of the at least one object with respect to the estimation vector, or a second angular spacing of the at least one object with respect to the estimation vector,
the registration determination section is further configured to:
determine the parameter includes one of the first angular spacing or the second angular spacing;
in a case where the parameter includes the first angular spacing, set the reliability as a first reliability; and
in a case where the parameter includes the second angular spacing, set the reliability as a second reliability,
the first angular spacing is smaller than the second angular spacing, and
the first reliability is higher than the second reliability.

9. The information processing apparatus according to claim 4, wherein
the parameter, associated with the at least one object, includes information associated with a user selection of the at least one object, and
the registration determination section is further configured to set, based on the information associated with the user selection of the at least one object, a value of the reliability to a maximum value among a plurality of values of the reliability.

10. The information processing apparatus according to claim 4, wherein the registration determination section is further configured to:
   determine the reliability is less than a first threshold; and
   discard the registration of the calibration data in the data store based on the determination that the reliability is less than the first threshold.

11. The information processing apparatus according to claim 10, wherein
   the data store includes a plurality of pieces of registered calibration data,
   the registration of the calibration data in the data store is subsequent to a registration of the plurality of pieces of registered calibration data, and
   the registration determination section is further configured to control the first threshold based on a number of the plurality of pieces of registered calibration data.

12. The information processing apparatus according to claim 4, wherein
   the data store includes a plurality of pieces of registered calibration data,
   the registration of the calibration data in the data store is subsequent to a registration of the plurality of pieces of registered calibration data in the data store,
   the registration determination section is further configured to:
      extract at least one first piece of registered calibration data of the plurality of pieces of registered calibration data, wherein the at least one first piece of registered calibration data includes a vector;
      determine that an angular spacing of the vector with respect to the estimation vector is less than or equal to a second threshold;
      determine a reliability associated with the at least one first piece of registered calibration data;
      determine, based on the determination that the angular spacing of the vector with respect to the estimation vector is less than or equal to the second threshold, the reliability of the calibration data is higher than the reliability associated with the at least one first piece of registered calibration data; and
      based on the determination that the reliability of the calibration data is higher than the reliability associated with the at least one first piece of registered calibration data,
         delete the at least one first piece of registered calibration data from the data store; and
         register the calibration data in the data store.

13. The information processing apparatus according to claim 1, wherein
   the correction amount calculator is further configured to calculates the correction amount based on a first object, among the plurality of objects, that is closest to the estimation vector.

14. The information processing apparatus according to claim 1, wherein
   the correction amount calculator is further configured to calculate a plurality of correction amounts associated with the plurality of objects,
   the plurality of correction amounts includes the correction amount, and
   a first correction amount of the plurality of correction amounts is calculated based on a first object of the plurality of objects.

15. The information processing apparatus according to claim 1, wherein the registration determination section is further configured to cancel the registration of the calibration data in the data store based on a user cancellation operation.

16. The information processing apparatus according to claim 1, wherein
   the estimation vector indicates an optical axis of a user eyeball,
   the correction amount calculator is further configured to set a shape of the specific angular range as a shape of a cone that has an apex angle of 20 degrees or less, and
   the estimation vector is a central axis of the cone.

17. The information processing apparatus according to claim 1, wherein
   the correction amount calculator is further configured to set a boundary plane in a depth direction of the specific angular range based on an angle of convergence by a plurality of line of sights, and
   the plurality of line of sights includes the line of sight.

18. An information processing method, comprising:
   determining a direction of a line of sight;
   calculating an estimation vector based on the direction of the line of sight;
   setting a specific angular range based on the estimation vector as a reference;
   calculating a correction amount, associated with the estimation vector, based on at least one object, of a plurality of objects, that is within the specific angular range;
   generating calibration data that includes each of the estimation vector and the correction amount associated with the estimation vector; and
   controlling, based on a parameter associated with the at least one object, a registration of the generated calibration data in a data store.

19. A non-transitory computer-readable recording medium having stored thereon computer-executable instructions that, when executed by an information processing apparatus, cause the information processing apparatus to execute operations, the operations comprising:
   determining a direction of a line of sight;
   calculating an estimation vector based on the direction of the line of sight;
   setting a specific angular range based on the estimation vector as a reference;
   calculating a correction amount, associated with the estimation vector, based on at least one object, of a plurality of objects, that is within the specific angular range;
   generating calibration data that includes each of the estimation vector and the correction amount associated with the estimation vector; and
   controlling, based on a parameter of the at least one object, a registration of the generated calibration data in a data store.

20. An information processing apparatus, comprising:
   a line-of-sight estimator configured to:
      determine a direction of a user line of sight; and
      calculate an estimation vector based on the direction of the user line of sight;
   a correction amount calculator configured to:
      set a specific angular range based on the estimation vector as a reference; and
      calculate a correction amount, associated with the estimation vector, based on at least one object, of a plurality of objects, that is within the specific angular range; and a registration determination section configured to:
   generate calibration data that includes each of the estimation vector, and the correction amount associated with the estimation vector;
   set a reliability of the calibration data based on a parameter associated with the at least one object;
   generate a data set which includes each of the calibration data and the reliability of the calibration data, wherein
      in the data set, the estimation vector is associated with both the correction amount and the reliability, and
      in the data set, the correction amount is associated with both the estimation vector and the reliability; and
   control a registration of the generated data set in a data store based on the reliability of the calibration data.

* * * * *